US008620866B2

(12) United States Patent
Fitzpatrick et al.

(10) Patent No.: US 8,620,866 B2
(45) Date of Patent: *Dec. 31, 2013

(54) DISTRIBUTED MANAGEMENT FRAMEWORK FOR PERSONAL ATTRIBUTES

(75) Inventors: Mark Fitzpatrick, San Mateo, CA (US); Anthony Siress, Mountain View, CA (US)

(73) Assignee: YOUnite, Inc., Mountain View, CA (US)

( * ) Notice: Subject to any disclaimer, the term of this patent is extended or adjusted under 35 U.S.C. 154(b) by 956 days.

This patent is subject to a terminal disclaimer.

(21) Appl. No.: 12/267,240

(22) Filed: Nov. 7, 2008

(65) Prior Publication Data

US 2009/0119266 A1 May 7, 2009

Related U.S. Application Data

(63) Continuation of application No. 11/397,817, filed on Apr. 3, 2006, now Pat. No. 7,461,071.

(60) Provisional application No. 60/668,302, filed on Apr. 4, 2005.

(51) Int. Cl.
*G06F 7/00* (2006.01)

(52) U.S. Cl.
USPC .......................................... 707/636; 707/704

(58) Field of Classification Search
USPC ......... 707/10, 9, 636, 704; 717/168; 709/206; 713/201; 455/412.2
See application file for complete search history.

(56) References Cited

U.S. PATENT DOCUMENTS

| 6,269,369 | B1* | 7/2001 | Robertson ............................. 1/1 |
| 6,526,513 | B1 | 2/2003 | Shrader |
| 6,754,665 | B1 | 6/2004 | Kawamoto et al. |
| 6,990,482 | B1 | 1/2006 | Piotrowski et al. |
| 7,003,546 | B1 | 2/2006 | Cheah |
| 7,139,555 | B2* | 11/2006 | Apfel ......................... 455/412.2 |
| 7,277,911 | B2 | 10/2007 | Cheah |
| 7,316,013 | B2* | 1/2008 | Kawano et al. ............... 717/168 |
| 7,461,071 | B2 | 12/2008 | Fitzpatrick et al. |
| 7,698,445 | B2 | 4/2010 | Fitzpatrick et al. |
| 7,743,019 | B2 | 6/2010 | Shah et al. |
| 7,743,100 | B2 | 6/2010 | Cheah |
| 8,151,342 | B2 | 4/2012 | Choi et al. |

(Continued)

OTHER PUBLICATIONS

Non-Final Office Action Mailed May 29, 2009, in Co-pending U.S. Appl. No. 11/643,064, filed Dec. 20, 2006.

(Continued)

*Primary Examiner* — Hung T Vy
(74) *Attorney, Agent, or Firm* — Sheppard, Mullin, Richter & Hampton LLP

(57) ABSTRACT

A technique for distributed management of attributes includes propagating attributes based upon attribute-granularity permissions. An example of a system according to the technique may include a server, coupled to a first client and a second client, that includes a module that receives attribute data from the first client; a permissions database where first permissions associated with the first client are set at the individual attribute level for the second client; an engine for updating the permissions database and for validating the first permissions for the second client; and an engine for distributing first client updates based on validated permissions to destinations associated with the one or more second destination stores.

18 Claims, 24 Drawing Sheets

(56) References Cited

U.S. PATENT DOCUMENTS

| | | | |
|---|---|---|---|
| 2002/0059236 A1 | 5/2002 | Satoh | |
| 2002/0083327 A1 | 6/2002 | Rajasekaran et al. | |
| 2002/0174363 A1 | 11/2002 | Chefalas et al. | |
| 2002/0194100 A1 | 12/2002 | Choban et al. | |
| 2003/0069874 A1 | 4/2003 | Hertzog et al. | |
| 2004/0215734 A1 | 10/2004 | Nagai et al. | |
| 2004/0254810 A1 | 12/2004 | Yamaga et al. | |
| 2005/0028012 A1 | 2/2005 | Amamiya et al. | |
| 2005/0120084 A1* | 6/2005 | Hu et al. | 709/206 |
| 2005/0154915 A1* | 7/2005 | Peterson et al. | 713/201 |
| 2005/0234864 A1 | 10/2005 | Shapiro | |
| 2005/0289127 A1 | 12/2005 | Giampaolo et al. | |
| 2006/0224590 A1 | 10/2006 | Boozer et al. | |
| 2007/0027953 A1* | 2/2007 | Wu | 709/206 |
| 2009/0031418 A1 | 1/2009 | Matsuda et al. | |
| 2010/0257248 A1 | 10/2010 | Cheah | |
| 2011/0093340 A1 | 4/2011 | Kramer et al. | |

OTHER PUBLICATIONS

Advisory Action Mailed Feb. 24, 2009, in Co-pending U.S. Appl. No. 11/643,064, filed Dec. 20, 2006.
Final Office Action Mailed Dec. 12, 2008, in Co-pending U.S. Appl. No. 11/643,064, filed Dec. 20, 2006.
Non-Final Office Action Mailed Jun. 13, 2008, in Co-pending U.S. Appl. No. 11/643,064, filed Dec. 20, 2006.
Non-Final Office Action Mailed May 21, 2009, in Co-pending U.S. Appl. No. 11/734,664, filed Apr. 12, 2007.
Notice of Allowance Mailed Dec. 3, 2009, in Co-pending U.S. Appl. No. 11/734,664, filed Apr. 12, 2007.
International Search Report of PCT/US2007/088234, Jul. 29, 2008, 1 page.
Written Opinion of PCT/US2007/088234, Jul. 29, 2008, 7 pages.
International Search Report of PCT/US2006/012582, Jun. 19, 2008, 1 page.
Written Opinion of PCT/US2006/012582, Jun. 19, 2008, 6 pages.
Co-pending U.S. Appl. No. 11/397,817, filed Apr. 3, 2006.
Co-pending U.S. Appl. No. 11/643,064, filed Dec. 20, 2006.
Co-pending U.S. Appl. No. 12/267,508, filed Nov. 8, 2008.
Co-pending U.S. Appl. No. 12/267,520, filed Nov. 7, 2008.
Co-pending U.S. Appl. No. 11/734,664, filed Apr. 12, 2007.
Co-pending U.S. Appl. No. 12/715,306, filed Mar. 1, 2010.
Co-pending U.S. Appl. No. 12/793,597, filed Jun. 3, 2010.
Non-Final Office Action Mailed Feb. 6, 2008, in Co-pending U.S. Appl. No. 11/397,817, filed Apr. 3, 2006.
Notice of Allowance Mailed Oct. 15, 2008, in Co-pending U.S. Appl. No. 11/397,817, filed Apr. 3, 2006.
Final Office Action Mailed Feb. 4, 2010, in Co-pending U.S. Appl. No. 11/643,064, filed Dec. 20, 2006.

* cited by examiner

600 →

602

| UID | Connect Info |
|---|---|
| 00001 | e.g., ip/port |
| 00002 | e.g., ip/port |
| 00003 | e.g., ip/port |

⋮

604

| FID | Connect Info |
|---|---|
| 00001 | Full Name |
| 00002 | First |
| 00003 | Last |

⋮

606

| Grantor UID | FID | Grantee UID |
|---|---|---|
| 00003 | 00001 | 00001 |
| 00003 | 00002 | 00001 |
| 00004 | 00003 | 00003 |

⋮

608

| Grantor UID | Grantee UID | Push/Pull | FID | Value |
|---|---|---|---|---|
| 00003 | 00001 | TRUE | 00003 | Jones |
| 00004 | 00003 | FALSE | 00006 | NetApp |

DISTRIBUTED MANAGEMENT FRAMEWORK FOR PERSONAL ATTRIBUTES

CROSS-REFERENCE TO RELATED APPLICATIONS

This patent application is a Continuation of U.S. patent application Ser. No. 11/397,817, filed Apr. 3, 2006, which claims priority to U.S. Provisional Patent App. No. 60/668,302, filed Apr. 4, 2005, which are both incorporated herein by reference.

BACKGROUND

Databases are collections of data entries which are organized, stored, and manipulated in a manner specified by applications known as database managers. The manner in which database entries are organized in a database is known as the data structure of the database. Database managers organize information in a database into records, with each record made up of fields. Fields and records may have different characteristics depending upon the purpose and functionality of the database manager. The term "database," as used herein, describes data entries and associated database managers. Hereinafter, the term "database" is intended to include both data entries and associated database managers.

It is sometimes desirable to synchronize databases. The term "synchronize," as used herein, refers to database operations, associated with two or more devices, that change the contents of one database so that it matches, or "mirrors", the contents of the other database. Synchronization may be total (e.g., mirroring all of the contents of a database) or partial (e.g., mirroring a subset of all of the content of a database). A prior art technique for accomplishing this synchronization, sometimes referred to as "slow synchronization" involved comparing each record in each database. It may be noted that slow synchronization many not be capable of partial synchronization. Moreover, slow synchronization is complicated and time-consuming.

Another prior art technique to synchronize databases involves implementing a change log. The change log contains information regarding records which have been operated upon in either database subsequent to synchronization therebetween. The change log also records the time at which a synchronization operation was last performed between two databases, so that changes made prior to a previous update can be ignored. Then, synchronization procedures use the change log to determine what records should be synchronized. This alleviates the burden of synchronizing the entire databases. This technique is sometimes referred to as "fast synchronization."

One weakness with the techniques may be illustrated with the following example. Suppose mirrored information resides on a first device and on a second device. A change is made on the first device to new valid information. A change is subsequently made on the second device, changing old, invalid data to updated, but invalid data. Typically, a timestamp would be associated with both changes in a change log. When resolving the two changes, the most recent timestamp would be favored. Accordingly, in this example, the change on the first device to new, valid data would not be implemented on the second device because a change was made in the interim (i.e., before synchronization to mirror the valid data).

Because the timestamps play an important role in the synchronization process, clocks in the devices may need to be accurate, aligned with one another, and unchanged. This is not always the case in, for example, mobile devices. Indeed, it is quite common for the user of a mobile device to travel to another time zone and therefore, change the time on the device's clock. This can cause problems with synchronization. In some cases, problems with timestamps can cause devices to ignore changes in the synchronization effort, effectively losing the change.

In addition to the synchronization problems, users may find it tedious, or forget to update databases with new data. For example, a user may update an address book locally, but fail to send updates to acquaintances to inform them of the changed information. Moreover, users who receive updated information may forget to update the contact information or may find it tedious to update information continuously for a large number of contacts. For enterprises that maintain a contact database, this can be particularly time-consuming.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for distributed management of attributes includes propagating attributes based upon attribute-granularity permissions. An example of a method according to the technique may include maintaining first attributes associated with a first entity of a plurality of entities and second attributes associated with a second entity of the plurality of entities. The method may further include linking the first entity with a second entity. The method may further include providing first destinations, associated with the first entity, for the second attributes. The method may further include granting first permissions for the first attributes to the second entity. The method may further include providing second destinations, associated with the second entity, for the first attributes. The method may further include granting second permissions for the second attributes to the first entity. The method may further include facilitating the propagation of shared attributes to the destinations through the permissions. The method may further include managing subsequent changes of attributes to create a syndicated distributed secure data exchange.

An example of a system according to the technique may include a server, coupled to a first client and a second client, that includes a module that receives attribute data from the first client; a permissions database where first permissions associated with the first client are set at the individual attribute level for the second client; an engine for updating the permissions database and for validating the first permissions for the second client; and an engine for distributing first client updates based on validated permissions to destinations associated with the one or more second destination stores.

The proposed system, method and device can offer, among other advantages, distributed management of attributes. This and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

FIG. 6 depicts several examples of tables that may be included in a database of the system of FIG. 1.

DETAILED DESCRIPTION

Figure 1:
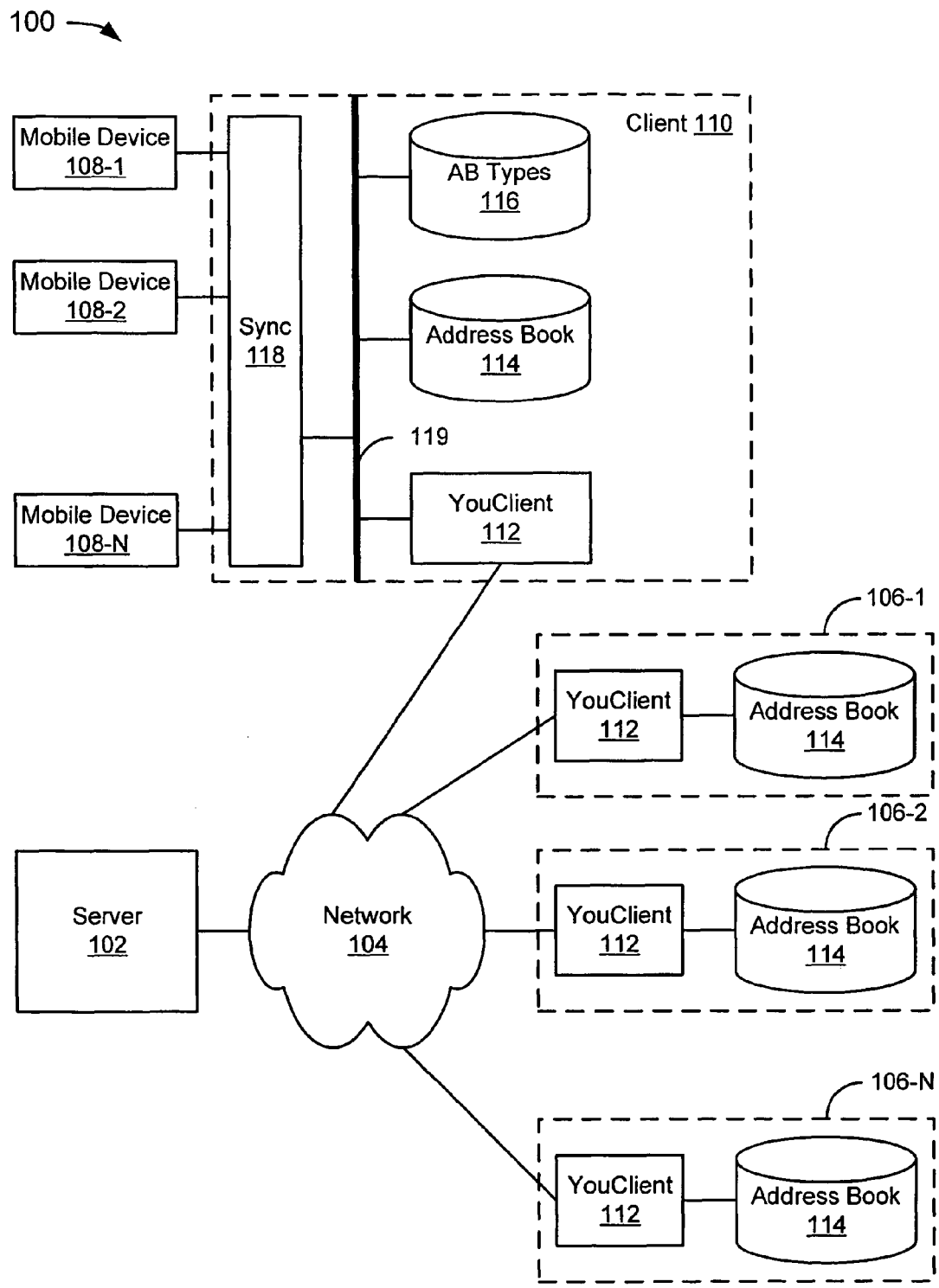
FIG. 1 depicts a conceptual view of a contact database synchronization system.

FIG. 1 depicts a conceptual view of a secure contact database synchronization system 100 according to an embodiment. In the example of FIG. 1, the system 100 includes a server 102, a network 104, clients 106-1 to 106-N (referred to collectively hereinafter as clients 106), mobile devices 108-1 to 108-N (referred to collectively hereinafter as mobile devices 108), and a client 110. It may be noted that the client 110 is distinguished from the clients 106 for the purposes of example only. Aspects described with reference to any one of the clients 106, 110 may be applicable to all or a subset of the clients 106, 110.

The server 102 may include various hardware and/or software components, as described later with reference to FIGS. 7 and 8. The network 104 may be the Internet, or any other network, as described later with reference to FIGS. 7 and 8.

The clients 106 may include various hardware and/or software components, as described later with reference to FIGS. 7 and 8. In addition, in an embodiment, the clients 102 include a YouClient 112 and an Address Book 114. Functionality of the YouClient 112 is described later with reference to FIGS. 4 and 5. The Address Book 114 may have any of a variety of address book configurations including by way of example but not limitation, Palm Address Book (AB), Outlook AB, Mozilla AB, Entourage AB, Max OS X AB, or any known or eventual AB type.

The mobile devices 108 may include various hardware and/or software components, as described later with reference to FIGS. 7 and 8. Indeed, the clients 106 could be mobile devices. However, for illustrative purposes, the mobile devices 108 synch with the client 110 in a manner that is known in the computer arts. For example, the mobile device 108-1 may be by way of example but not limitation a mobile phone, and the mobile device 108-2 may be by way of example but not limitation a PDA, both of which can synch with, by way of example but not limitation, a Mac OS X Address Book on a user's computer (e.g., the client 110) through an iSync mechanism, which is known in the computer arts. The client 110 would then update local databases based upon the results of the iSync. Comparable technologies exist for various AB types and various operating systems.

The client 110 may include various hardware and/or software components, as described later with reference to FIGS. 7 and 8. In addition, in an embodiment, the client 110 includes a YouClient module 112, an Address Book 114, an AB Type database (dB) 116, and a Sync module 118. The various components are connected to a bus 119. It may be noted that alternative embodiments that do not connect some or all of the components to the bus 119 are possible, particularly in a distributed architecture, as would be apparent to one of ordinary skill in the art of computer architecture.

Functionality of the YouClient module 112 is described later with reference to FIGS. 4 and 5. The Address Book 114 may have any of a variety of address book configurations. The AB Type dB 116 includes data related to various AB types with which the YouClient module is configured to synch. In an embodiment, adding a new AB type to the AB Type dB 116 does not result in the need for recompilation or other reconfiguration of the YouClient module 112. In another embodiment, no recompilation or other reconfiguration of the YouClient module 112 is necessary when the Address Book 114 (or an Address Book of one of the mobile devices 108 or clients 106) is changed from one AB type to another or when the Address Book 114 is upgraded to a new version. The sync module 118 facilitates synching of the mobile devices 108 with the client 110 in a manner that is known. The YouClient module 112 detects updates accomplished by the sync module 118 and performs appropriate actions, as described in more detail with reference to FIGS. 4 and 5.

In an example of operation, a subscriber is associated with the client 110. The subscriber owns the mobile devices 108 (or, at least, an owner of a mobile device has access to the sync module 118). The subscriber can update address books on the mobile devices 108 and/or the subscriber can update the address book 114 using an input device (examples of which are provided with reference to FIGS. 7 and 8). The AB types dB 116 may or may not be able to recognize the address books of the mobile devices 108. Recognition is not necessary if the sync module 118 can render the data in a format that is recognizable to the YouClient module 112.

In any case, whether changes to the address book 114 are accomplished through synching the address book of one or more of the mobile devices 108 or by some other means, such as subscriber input, the YouClient module 112 detects the change. Then the YouClient module 112 performs certain tasks, such as checking permissions, as described in more detail with reference to FIGS. 4 and 5, and forwards data associated with the update, with appropriate instructions if necessary, through the network 104 to the server 102. In an embodiment, to ensure security, transactions between the client 110 and the server 102 are encrypted.

The server 102 performs tasks, described in more detail with reference to FIGS. 4 and 5, that include forwarding the updates onto the YouClient modules of the respective clients 108.

In a non-limiting embodiment, the respective YouClient modules of the clients 108 periodically signal the server 102 that they are awake and/or ready to receive updates. The server 102 sends updates through the network 104 to the clients 108 that are ready and/or allowed to receive updates. When the clients 108 receive the updates, their respective YouClient modules update their respective address books.

Figure 2:
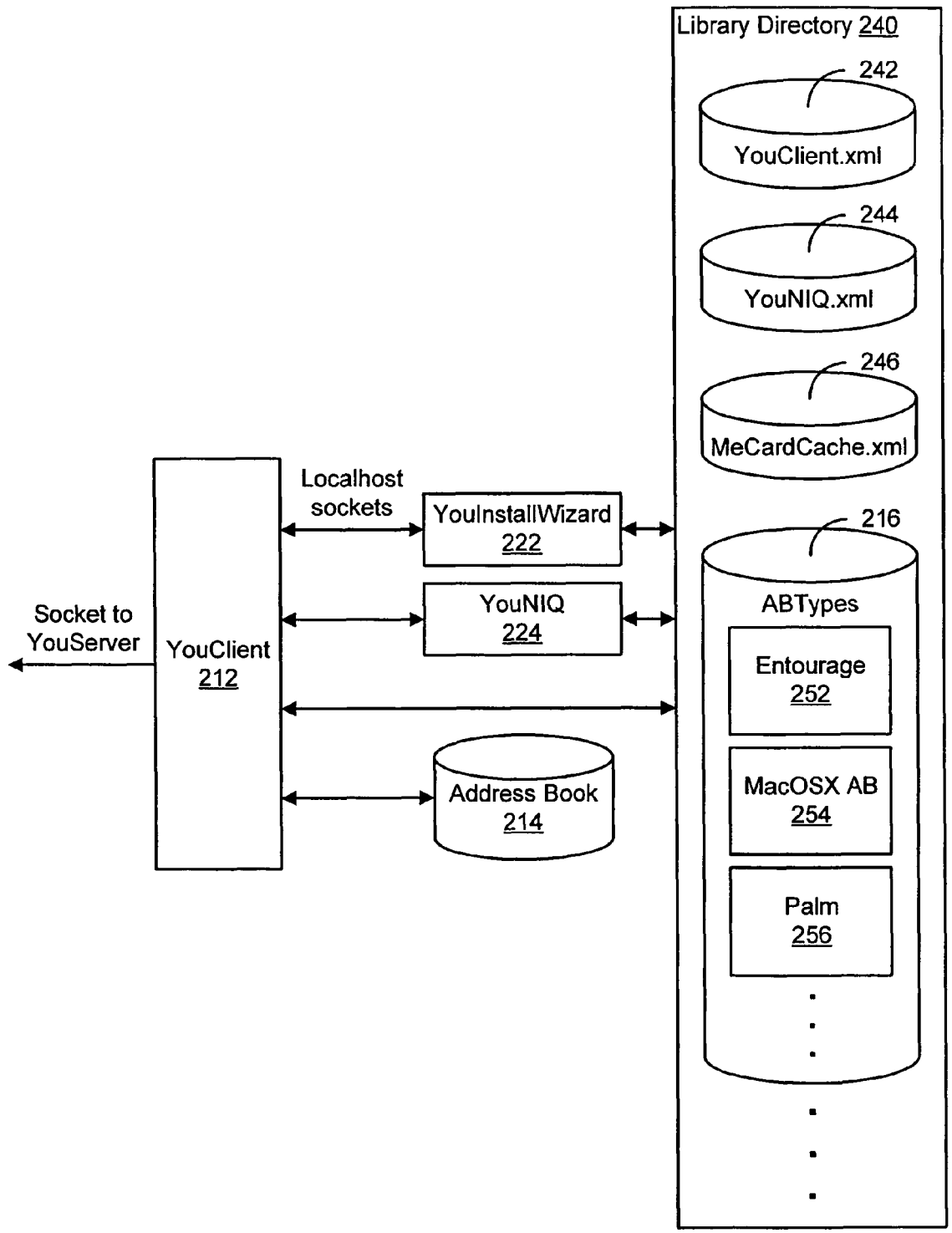
FIG. 2 depicts a client computer for use in the system of FIG. 1.

FIG. 2 depicts a client computer 210 according to an embodiment. The client computer 210 may be similar to the client 110 (FIG. 1). In the example of FIG. 2, the client computer 210 includes a YouClient 212, an address book 214, a YouInstallWizard 222, a YouNIQ module 224, and a library directory 240. The YouInstallWizard 222 is used to set up local files on the computer 210. Functionality of the YouInstallWizard 222 is described later with reference to FIGS. 4 and 5. The YouNIQ module 224 is used to, by way of example but not limitation, set permissions to control what information to share with others, such as the clients 106 (FIG. 1). Functionality of the YouNIQ module 224 is described in more detail with reference to FIGS. 4 and 5. In a non-limiting embodiment, the YouClient 212 is a Java application. In another non-limiting embodiment, the YouInstallWizard 222 and the YouNIQ module 224 have associated Java GUIs.

In the example of FIG. 2, the library directory 240 includes a YouClient.xml file 242, a YouNIQ.xml file 244, a MeCard-Cache.xml file 246, and an AB types dB 216. The YouClient.xml file 242 may include data associated with local configuration information. The YouNIQ.xml file 244 may include data associated with permissions and profiles. The MeCard-Cache.xml file 246 may include data associated with a 'me' record that was previously sent to a server, such as the server 102 (FIG. 1). These files are illustrated for the purposes of example and are intended to represent broad categories of files that may be used to facilitate functionality described with reference to FIGS. 4 and 5. As such, the files could have any file type, including by way of example but not limitation, .xml. Moreover, there may be an arbitrary number of such files, perhaps only loosely associated with the information just described as associated with the various files.

In the example of FIG. 2, the AB types dB 216 includes an Entourage type 252, a MacOSX AB type 254, a Palm type 256, and others (not shown). These types are listed by way of non-limiting embodiment. A given AB types dB 216 may or may not include the indicated types, and might even contain no types, pending addition of AB types. In an embodiment, adding new AB types may include loading a new ABType class, which will often be a well-defined interface, in the AB types dB 216. In such an embodiment, the indicated types 252, 254, 256 may be representative of an ABType class. It may be noted that data representations other than classes may be used in alternative embodiments.

In operation, a subscriber executes the YouInstallWizard 222 to connect to a server, such as the server 102 (FIG. 1) to obtain, by way of example but not limitation, a UID. Alternatively, the YouInstallWizard 222 may be executed automatically when the address book 214 is updated, or in response to some other stimulus. The subscriber may also use the YouInstallWizard 222 to set up local files on the computer 210, assuming the platform allows for local files. Alternatively, the YouInstallWizard 222 may perform some or all of the requisite or desired configurations automatically or in response to some other stimulus. The subscriber may also use the YouInstallWizard 222 to get user data associated with those who have allowed for us to update our records in their databases. Alternatively, the YouInstallWizard 222 may obtain the data automatically or in response to some other stimulus. The subscriber may or may not use a GUI associated with the YouInstallWizard 222 to enter some or all of the requisite information. In an embodiment, the YouInstallWizard 222 gets a new UID and sets up local files on a client device (if the platform allows for local files). The YouInstallWizard 222 also gets users (if any) that have allowed for the subscriber to update the subscriber's records in the users' address books.

The subscriber may or may not use a GUI associated with the YouNIQ module 224 to set permissions. The permissions control what information you may or may not share with others, such as the clients 106 (FIG. 1). The YouNIQ module 224 may initiate forwarding updates to appropriate parties. In an embodiment, the forwarded updates actually update a record associated with the subscriber on the relevant clients 106.

The YouClient module 212 checks permissions to determine who to forward the update to, then forwards data associated with the update to a server, such as the server 102 (FIG. 1). In a non-limiting embodiment, the server may request additional information if there is a problem and/or provide notification to the YouClient module 212 regarding the status of updates.

It may be noted that, in a non-limiting embodiment, the computer 210 may be updated by others. In this embodiment, the computer 210 is similar to one of the clients 106 (FIG. 1). In operation, the YouClient module 212 may or may not periodically signal a server, such as the server 102 (FIG. 1) that the computer 210 is awake and/or ready to receive updates. If the server has updates to send, then the server may send the update, along with other information if applicable. The YouClient module 212 receives the update and updates a local address book accordingly.

Figure 3:
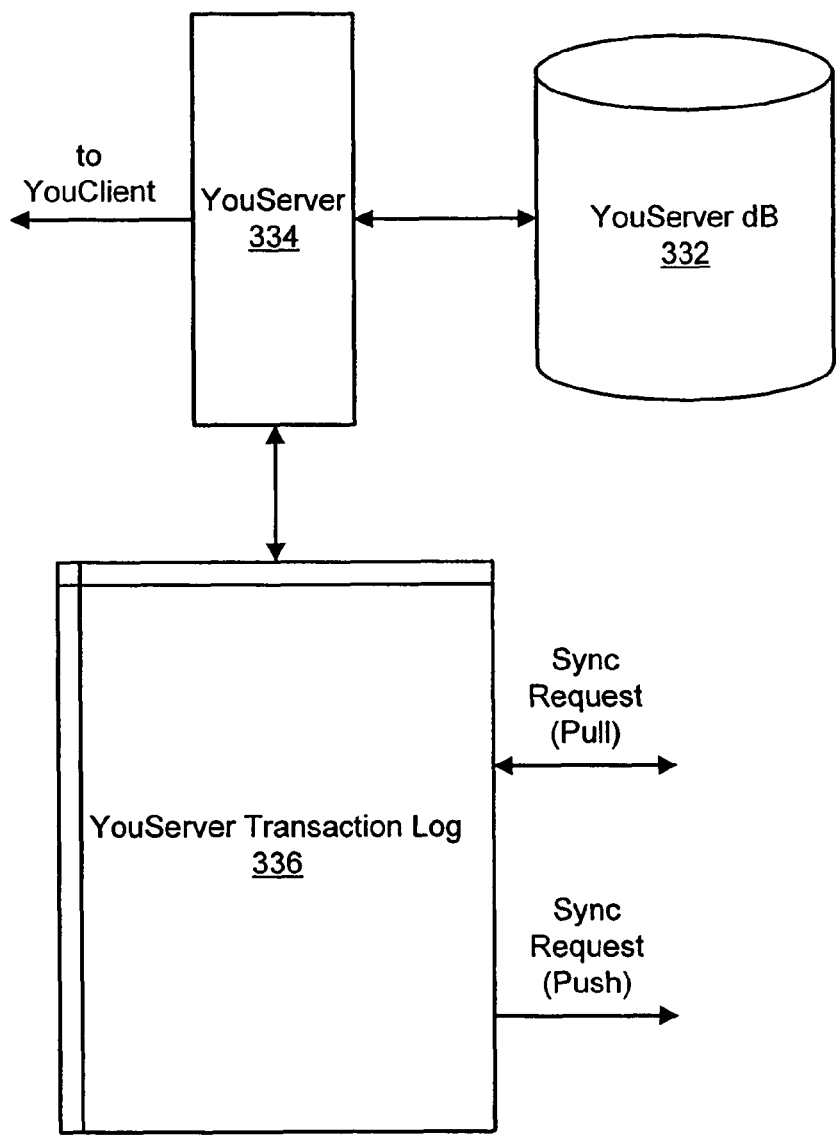
FIG. 3 depicts a server computer for use in the system of FIG. 1.

FIG. 3 depicts a server 302 according to an embodiment. The server 302 includes a YouServer database 332, a YouServer module 334, and a YouServer transaction log 336. The YouServer database 332 may include a variety of records including by way of example but not limitation users (including, e.g., a UID and connection information, such as ip/port); fields defined by, for example, a vCard specification (including, e.g., FID and field name); permission tables (including, e.g., grantor UID, FID, grantee UID); and pending transaction logs (e.g., grantor UID, grantee UID, push/pull Boolean, FID, value). In addition, there may be a database associated with internal schema, such as billing.

In a non-limiting embodiment, a function of the YouServer module 334 is to respond to requests from clients, such as the client 210 (FIG. 2). The YouServer module 334 may make use of, by way of example but not limitation, an SQL database to keep track of subscribers, permissions, and pending transactions. The YouServer database 332 may or may not include the SQL database. Requests from clients may include by way of example but not limitation requests to set/change permissions of who gets copies of changes in a subscriber's 'me' record, get a user-id (UID) for a new subscriber, get the UIDs of users who have given permission to a subscriber to update records associated with the subscriber in the users' address books, receive and process data transaction requests (e.g., a Me engine detects a change in a 'me' record and sends it to the server if permissions are appropriately set and the server checks the permissions and puts <pushData> transactions in a transaction log), receive and process <awake> transactions from clients (e.g., a client may send periodic <awake> transactions to see if there is any new <pushData> available), and responding to a client's <awake> transaction with <pushData> if there is new data. The <awake> and <pushData> transactions are described later with reference to the example of FIGS. 5A and 5B.

The YouServer module 334 may receive information from a subscriber, typically from over a network, an administrator, from over a network or through a local input device, or a software and/or hardware application. The YouServer module 334 reads the YouServer database 332 if a read request is triggered by the input and writes the YouServer database 332 if a write request is triggered by the input. In addition, the YouServer module 334 updates the YouServer transaction log 336, which may be by way of example but not limitation an SQL transaction log.

The YouServer module 324 may receive subscriber information from an administrator, a subscriber, a third party vendor, and/or from automated modules. The subscriber (or other party) may send requests to the YouServer module 324 to read or write to the YouServer database 322 and to perform other functions. For example, the subscriber may send permission change notifications, which may prompt the YouServer module 324 to update permission tables in the YouServer database 322. As another example, the subscriber may send subscriber information updates, which may prompt the YouServer module 324 to update permission tables and/or to log a transaction in pending transaction log in the YouServer database 322. The subscriber may or may not be capable of sending an add user request, which would update user tables in the YouServer database 322. The subscriber may or may not be capable of updating account information, which could cause a read or write of an internal schema database. Other transactions may include user sync requests (pull) and user sync requests (push), which may access a pending transaction in the YouServer transaction log 326.

In operation, the YouServer module 324 receives subscriber information and updates the YouServer database 322 accordingly. Then the YouServer module 324 receives updates and associated instructions, if any, from the subscriber, who may be associated with a client computer, such as the client 110 (FIG. 1). The YouServer database 322 is modified according to the associated instructions, if necessary, and data associated with the updates is entered into the YouServer transaction log 326. Entries in the YouServer transaction log 326 include information sufficient to facilitate user sync requests for clients, such as the clients 106 (FIG. 1) that have permission to receive the updates. In a non-limiting embodiment, the YouServer transaction log 326 includes one entry for each client who is permitted to receive the update. In another embodiment, the YouServer transaction log 326 includes one entry for each update, including data sufficient to identify each client with permission to receive the update associated with the transaction log entry. If a client signals that it is ready to receive updates, and an update is represented in the YouServer transaction log 326, then the YouServer module 324 sends the update to the client and removes the entry from the YouServer transaction log 326 (assuming an embodiment wherein each transaction log entry is associated with a single client).

Figure 4:
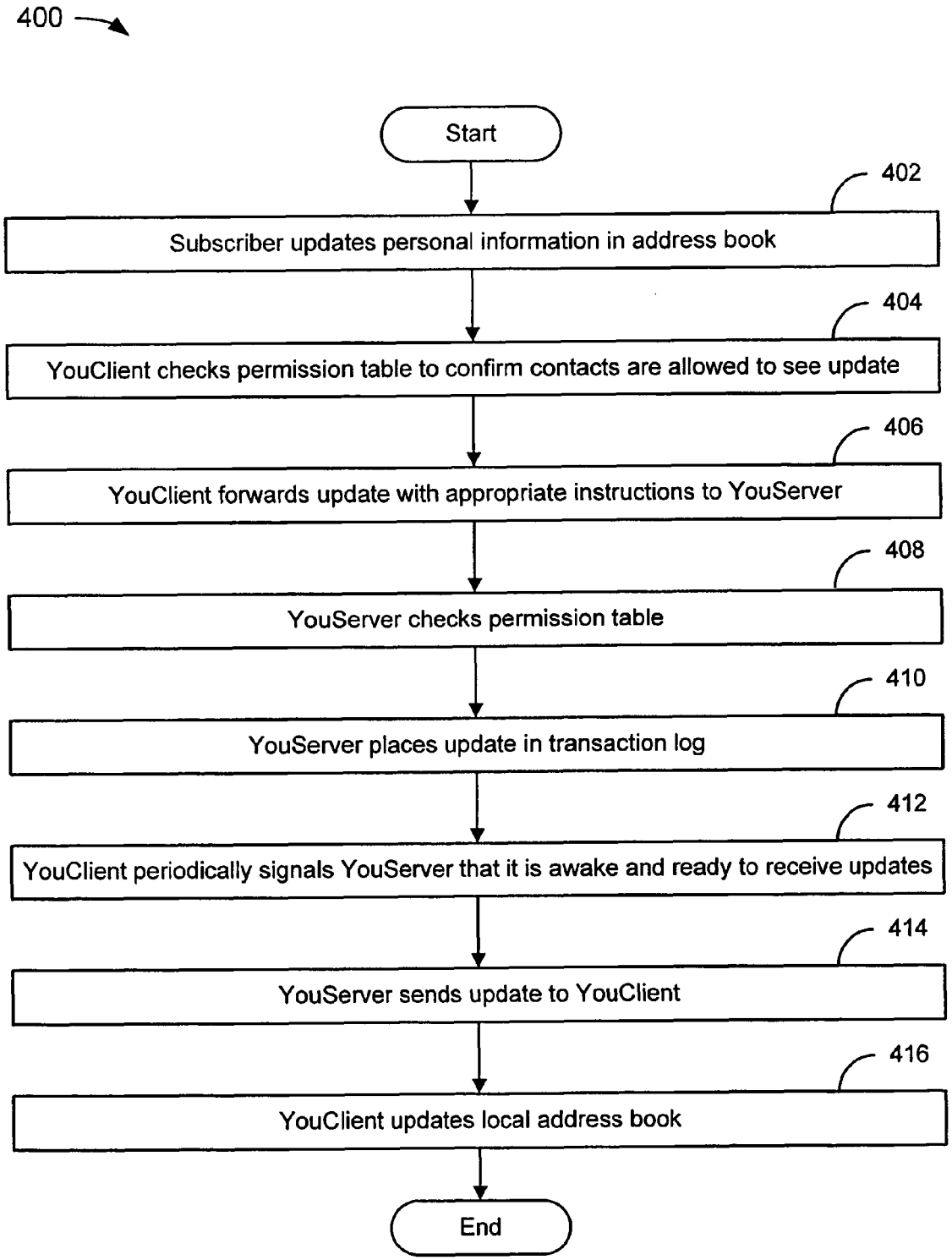
FIG. 4 depicts a flowchart associated with the system of FIG. 1.

FIG. 4 depicts a flowchart 400 associated with the system of FIG. 1 in an aspect of the embodiment. In an embodiment, the flowchart 400 starts at block 402 wherein a subscriber updates personal information in an address book. The address book may be, by way of example but not limitation, a Macintosh OS X address book.

In an embodiment, the flowchart 400 continues at block 404 wherein a YouClient module checks a permission table to confirm contacts are allowed to see an update. The permission table may or may not be locally available. Moreover, the subscriber may or may not be able to adjust permissions "on the fly." Of course, the subscriber should be able to adjust permissions at some point, whether on the fly, prior to updating an address book, or at some other point.

In an embodiment, the flowchart 400 continues at block 406 wherein a YouClient forwards an update with appropriate instructions, if appropriate, to a YouServer. Instructions may or may not be appropriate when sending updates. For example, if the YouServer knows how to handle an update without additional instructions, then the additional instructions may not be needed. Alternatively, a YouServer may need additional instructions to, by way of example but not limitation, identify the subscriber (if such information is not determinable from the update) or to change permissions at the YouServer prior to updating. In various embodiments, the update may be sent as a single update for multiple clients or as a single update for each of multiple clients.

In an embodiment, the flowchart 400 continues at block 408 wherein a YouServer checks a permission table. This permission table may or may not be similar to the permission table that is local to a client associated with a subscriber. The permission table may be, by way of example but not limitation, an SQL table.

In an embodiment, the flowchart 400 continues at block 410 wherein a YouServer places updates in a transaction log. Assuming an embodiment wherein the YouServer checks a permission table prior to placing updates in the transaction log, each entry of the transaction log may be associated with a single client who is allowed to receive the update. In such an embodiment, when the YouServer is aware that the client has been updated, the transaction log can be purged of the entry. In alternative embodiments, a single update may have multiple associated clients who are permitted to receive the update.

In an embodiment, the flowchart 400 continues at block 412 wherein a YouClient periodically signals a YouServer that it is awake and ready to receive updates. If the YouClient does not signal the YouServer for a period of time, then the YouServer may or may not purge a transaction log of an entry associated with an update for the YouClient. For example, if a YouClient is not available for a year, then the transaction log can be updated to remove the old update information. In this way, the transaction log can be maintained without allowing the log to grow unmanageably large. In addition, according to another embodiment, the transaction log could be purged of entries if the transaction log grows to an arbitrarily large size. The purge may be based upon the timestamp of an entry and/or upon other factors. In addition, two updates could be consolidated if a first update and a second update are associated with the same client.

In an embodiment, the flowchart 400 continues at block 414 wherein a YouServer sends updates to a YouClient. In an embodiment, the YouClient informs the YouServer that the YouClient is ready to receive updates and, in response, the YouServer sends any updates that are associated with the YouClient. In another embodiment, the YouServer may attempt to push information to the YouClient, which may or may not succeed depending upon whether the YouClient is able to receive the update.

In an embodiment, the flowchart 400 continues at block 416 wherein a YouClient updates a local address book. When the YouClient receives the update from a YouServer, the YouClient is presumed to have permission to update local contact information. Accordingly, the YouClient updates the local address book using the update. In an embodiment, a subscriber associated with the YouClient indicates beforehand that the YouClient is allowed to update a local address book when receiving updates from the YouServer. In another embodiment, the subscriber associated with the YouClient may be queried each time an update becomes available as to whether to allow the YouClient to update the local address book.

Figure 5A:
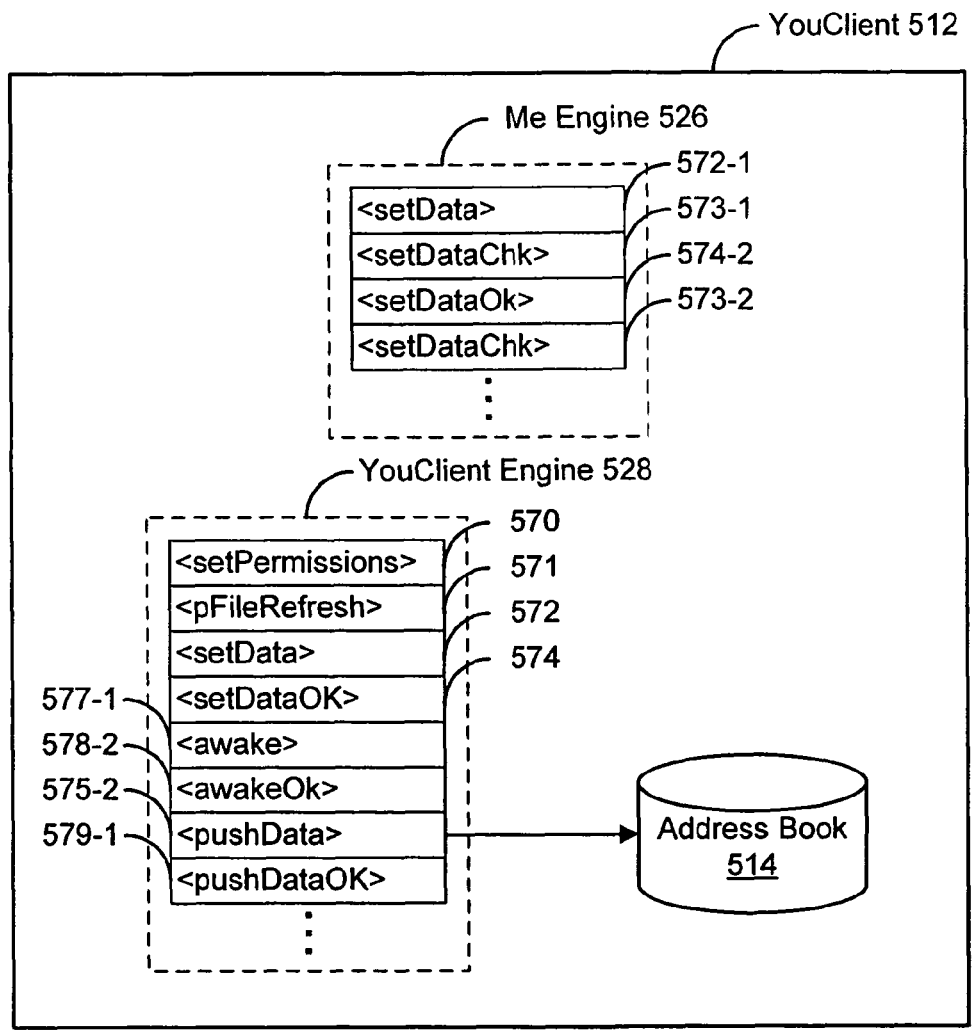
FIGS. 5A and 5B depict an example of a system and transactions associated with the system of FIG. 1.
Figure 5A:
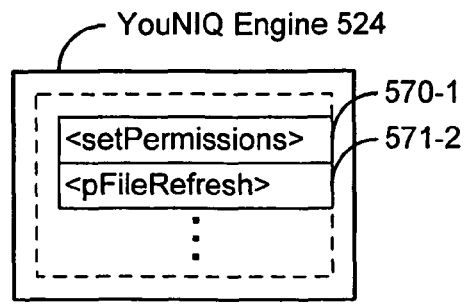
Figure 5B:
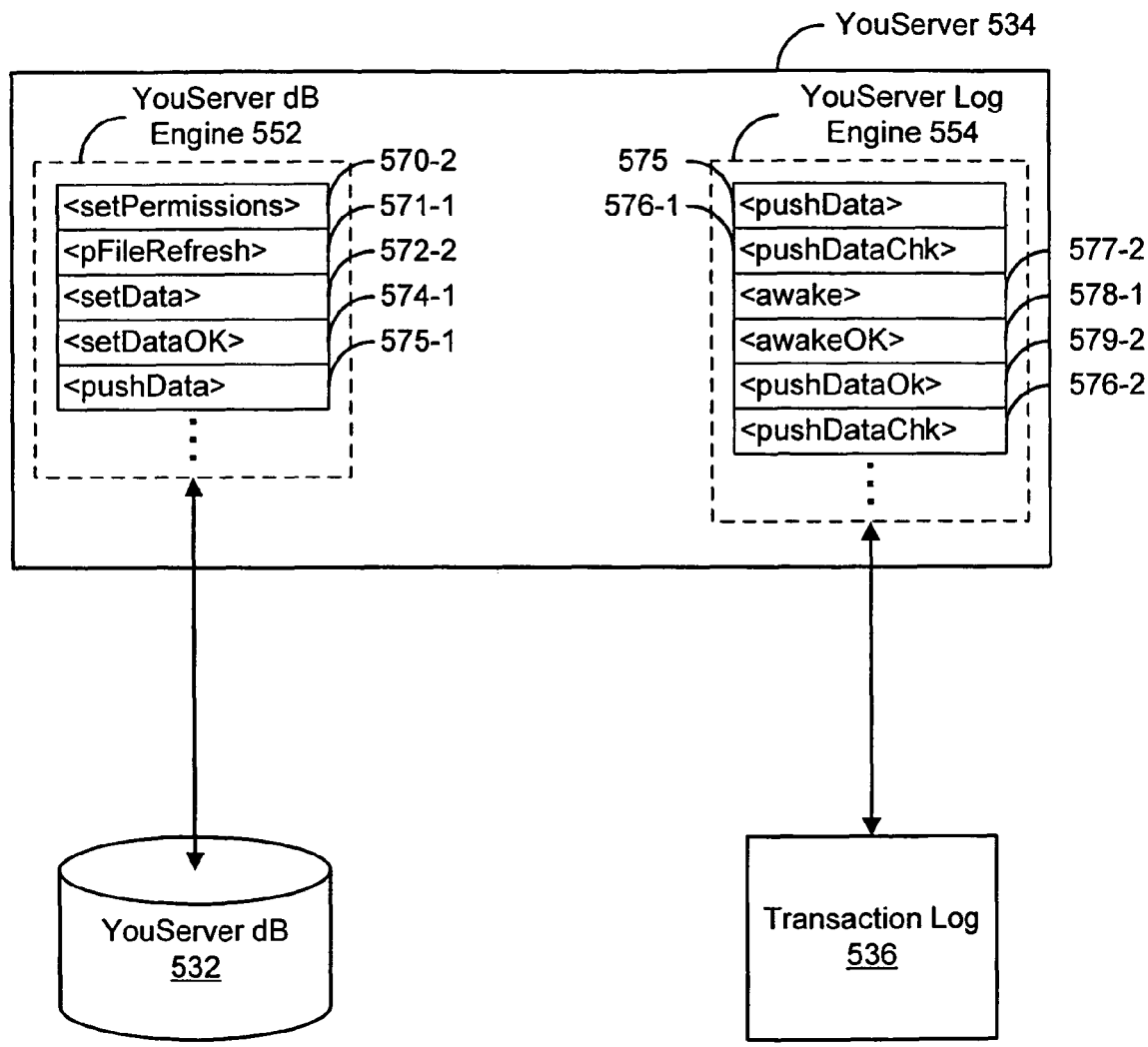

FIGS. 5A and 5B depict an example of a system 500 according to an embodiment and transactions associated with the system. The example of FIGS. 5A and 5B is intended to illustrate generation and consumption of transactions in a database synchronization system. It should be noted that this is but one of many ways of implementing a data synchronization system according to an embodiment and is intended only as a non-limiting example. Other embodiments may have more or fewer, and different, transactions.

The system 500 includes a YouClient module 512 and a YouNIQ engine 524. In the example of FIG. 5A, the YouClient module 512 includes a Me engine 526, a YouClient engine 528, and an address book 514.

In an embodiment, the YouNIQ engine 524 includes a GUI that facilitates a subscriber setting permissions. The permissions settings control what information the subscriber will share with other users. For example, if a user has permission to see the subscriber's home email information, the user will get the current value of the subscriber's home email when the permissions are appropriately set. Moreover, in another embodiment, the YouNIQ engine 524 may forward to users with permission any changes the subscriber makes to the home email over time. Notably, the YouNIQ engine 524 facilitates updating the subscriber's information in the users' local address books. In another embodiment, templates and/or defaults facilitate the setting of permissions by the subscriber without requiring the subscriber set individual fields. For example, a database may include information related to fields and use templates to provide updates of relevant fields.

In an embodiment, the me engine 526 detects updates to a subscriber's contact information on the subscriber's local machine. The me engine 526 sends the updates on to a server, which in turn may send the updates as <pushData> transactions on to users with permission to receive the updates.

In an embodiment, the YouClient engine 528 handles the local permission cache and acts as a conduit between the YouServer and the YouNIQ (and address book). In another embodiment, there is only one communication point between the YouServer and the client device. In another embodiment, the one-communication-point model is broken only when a subscriber installs the software associated with the YouService components and when a wizard, such as the YouInstallWizard 222 (FIG. 2) communicates with the server to configure the system 500 for a subscriber.

In an embodiment, the YouClient engine 528 also handles <pushData> transactions from the server and updates a user's address book 514. For example, if a user has given a subscriber access to the subscriber's record in the user's address book, the YouClient engine 528 on the user's client device can update the subscriber's record in the user's address book when the subscriber updates local information. Conceptually, if a subscriber is given permission by a user, the subscriber can reach into the user's address book to change data associated with the subscriber.

The system 500 includes a YouService dB 532, a YouServer module 534, and a transaction log 536. The YouService dB 532 may include multiple databases, tables, and/or records. An example of a YouService dB 532 according to a non-limiting embodiment is described with reference to FIG. 6 below. The YouServer module 534 may include a YouServer dB engine 552 and a YouServer log engine 554. In a non-limiting embodiment, the YouServer dB engine 552 handles transactions that read/write to the YouService dB 532. In a non-limiting embodiment, the YouServer log engine 554 handles all of the transaction log-type transactions, which may include <pushData>, examples of which are described below. The transaction log 536 may be designed to keep pending transactions even through a server crash.

It should be noted that an engine, as used herein, could refer to a process, thread, class, function, method, module, program, file, and/or some combination of these things, depending upon the platform, architectural decisions, and preferences. Other components may be used in various embodiments. For example, a broker component (not shown) could take incoming transactions and hand them off to the YouServer dB engine 552 or the YouServer log engine 554.

In the description of system 500 below, transaction reference numerals are represented as XXX-1 and XXX-2, where XXX-1 refers to the place where the transaction is generated and XXX-2 refers to the place where the transaction is consumed. The transaction, without regard to the location of generation and consumption, may be referred to as transaction XXX.

In the example of FIG. 5A, the YouNIQ engine 524 is responsible for providing a GUI to a subscriber. The subscriber can set permissions that enable other users to see information that is associated with the subscriber, such as contact information. When the subscriber using the YouNIQ engine 524 GUI clicks on an appropriate button (or performs some other action), the YouNIQ engine 524 generates a <setPermissions> transaction 570-1 and forwards the transaction 570 through the YouClient engine 528 to the YouServer dB engine 552 of the YouServer 534.

The YouService dB engine 552 consumes the <setPermissions> transaction 570-2 and stores new or updated permissions in a permissions table of the YouServer dB 532. If the YouService dB engine 552 successfully stores the permissions in the YouServer dB 532, the YouService dB engine 552 generates a <pFileRefresh> transaction 571-1 and forwards the transaction 571 through the YouClient engine 528 to the YouNIQ engine 524.

The YouNIQ engine 524 consumes the <pFileRefresh> transaction 571-2 and updates a local permission cache. In a non-limiting embodiment, the local permission cache is a file, but need not be. Moreover, for some clients there may not even be a local permission cache—the client may have to ask a server for its own permission table in this case.

In the example of FIG. 5A, the Me engine 526 is responsible for watching the fields of a subscriber's 'me' record. Examples of fields of the 'me' record are described in more detail below with reference to FIG. 6. If the Me engine 526 detects a change to a field in the 'me' record, then the Me engine 526 generates the <setData> transaction 572-1. In an embodiment, the Me engine 526 only generates the <setData> transaction 572-1 if the subscriber has given permission for another user (or users) to see the updated field.

In the example of FIG. 5A, after generating the <setData> transaction 572-1 (or at roughly the same time), the Me engine 526 generates a <setDataChk> transaction 573-1. The <setDataChk> transaction 573 is associated with a time interval of arbitrary length. If the Me engine 526 receives an indication that the <setData> transaction 571 was successful, then the <setDataChk> transaction 573 "times out." If, on the other hand, no indication is received that the <setData> transaction 571 was successful, the Me Engine may, in an embodiment, generate a new <setData> transaction 571 or the You-Client 512 could perform some other action to determine whether a new <setData> transaction 571 should be generated or the like.

Assuming the Me engine 526 generates the <setData> transaction 572-1, the transaction 572 is forwarded through the YouClient engine 528 to the YouServer 534, along with data associated with the update. In the example of FIG. 5B, the Server dB engine 552 is responsible for consuming the <setData> transaction 572-2 and updating the YouService dB 532 using data associated with the <setData> transaction 572. If the update is successful, the Server dB engine 552 generates a <setDataOK> transaction 574-1 and returns the <setDataOK> transaction to the YouClient engine 528, which forwards the <setDataOK> transaction 574 to the Me engine 526 and the <setDataChk> transaction 573-2 is consumed and terminated or timed out.

The YouClient 512 is done sending updated data and determining that the updated data has been received and recorded at the server. It should be noted that in an embodiment, the server may send additional information to the YouClient 512 following a successful or unsuccessful push to a client.

In the example of FIG. 5B, after the YouServer dB engine 552 consumes the <setData> transaction 572-2, the YouServer dB engine 552, in an embodiment, consults a permission table in the YouServer dB 532 to determine who is permitted to receive an update associated with the transaction 572. Then, using the permission data, the YouServer dB engine 552 generates one or more <pushData> transactions 575-1 and sends the transactions 575 to the YouServer log engine 554. In an embodiment, the YouServer dB engine 552 generates one <pushData> transaction 575-1 for each client who has permission to receive the update. For example, if a subscriber allows 10 people to receive updates, then the YouServer dB engine 552 may generate 10 <pushData> transactions 575-1.

The YouServer log engine 554 records data associated with the <pushData> transactions 575 as an entry in the transaction log 536. In a non-limiting embodiment, each such entry in the transaction log 536 is associated with a different client who has permission to receive the associated update.

In the example of FIG. 5B, at approximately the same time as the YouServer log engine 554 records the update data associated with the <pushData> transaction 575, the YouServer log engine 554 generates a <pushDataChk> transaction 574-1 and sends the transaction 574 to itself. The <pushDataChk> transaction 576 is similar to the <setDataChk> transaction 573 discussed previously except that the <pushDataChk> transaction 576 terminates or times out when the YouServer log engine 554 receives information that the data was successfully pushed to a client. Conceptually, the YouServer log engine 554 tells itself that it just did a <pushData> transaction to a client so it should wait a while and make sure that the client replied that it received the <pushData> transaction. If the client does not reply, then the YouServer log engine 554 may or may not make a note of it. In an embodiment wherein the YouServer log engine 554 is behind a firewall, the above-described implementation works in various embodiments. However, it should be noted that the <pushDataChk> transaction 576 may not be particularly useful unless the YouServer 534 is actively pushing data, as opposed to simply responding to a client. As one of skill in the art of firewalls would be aware, the server may only be able to respond to client requests if the server is separated from the client by a firewall. Accordingly, in an embodiment, the <pushDataChk> transaction 576 would typically be used if the server and client were both deployed behind an organization's firewall. It may be noted that the Me engine 526 may also generate a <pushDataChk> transaction 576-1, which may be consumed by the YouServer log engine 554 as described previously.

In the example of FIG. 5A, the YouClient engine 530 generates an <awake> transaction 577-1 to ask the YouServer 534 if there are any pending <pushData> transactions 575 for the client.

In the example of FIG. 5B, if there are no pending <pushData> transactions 575 for the client, then the YouServer log engine 554 generates an <awakeOK> transaction 578-1. The <awakeOK> transaction 578 indicates that the server recognizes that the client is ready to receive updates, but has none to provide.

In the example of FIG. 5A, the YouClient engine 528 consumes the <awakeOK> transaction 578-2 and, after a period of time, generates another <awake> transaction 577-1. This continues until a pending <pushData> transaction 575 becomes available. It may be useful to note that the YouClient engine 528 would probably be associated with a user other than the subscriber. Thus, the <setData> transaction 572-1 described previously (and associated with a first update) would probably be generated at a different client than the client consuming the <pushData> transaction 575-2 associated with the first update. Simply put, it would not be particularly advantageous for a client to consume its own updates.

In the example of FIG. 5B, if there is a pending <pushData> transaction 575 for the client, then the YouServer log engine 554 forwards the <pushData> transaction 575 to the client in response to the <awake> transaction 577. In an embodiment that does not include an <awake> transaction, the YouServer log engine 554 may simply forward the <pushData> transaction 575 when it becomes available.

In the example of FIG. 5A, the YouClient engine 528 pushes data associated with the <pushData> transaction 575 into the address book 514. Assuming the update is successful, the YouClient engine 528 generates a <pushDataOK> transaction 579-1, which is sent to the YouServer 534.

In the example of FIG. 5B, the YouServer log engine 554 successfully terminates the <pushDataChk> transaction 576-2, which means the server is aware that the data was successfully pushed to a client. The YouServer log engine 554 may purge the associated <pushData> transaction 575 from the transaction log 536. Typically, the YouServer 534 will inform the YouClient engine 530 that the data associated with the <setData> transaction 572 has been successfully pushed to a client, as well.

FIG. 6 depicts several examples of tables that may be included in a database, such as the YouServer dB 532 (FIG. 5), according to an embodiment. The tables include a user table 602, a field table 604, a permission table 606, and a pending transaction log 608.

In the example of FIG. 6, the user table 602 includes the fields UID and connect info. The UID may identify a subscriber and the connect info may identify, by way of example but not limitation, an ip/port number. When subscribers are added, entries may be added to the user table 602. Similarly, when subscribers are removed, entries in the user table 602 may be deleted. internal schema may have access to the user table 602 for, by way of example but not limitation, billing purposes.

In the example of FIG. 6, the field table 604 includes the fields FID and field name. The FID field identifies a field by number or some other identification scheme. The fieldname identifies a field associated with a specification, such as by way of example but not limitation the vCard specification.

In the example of FIG. 6, the permission table 606 includes the fields grantor UID, FID, and grantee UID. The grantor UID identifies a subscriber who is granting permission to access the field identified in the FID field to the user identified in the grantee UID field. The permission table 606 may be modified according to permission change notifications and user data changes.

In the example of FIG. 6, the pending transaction log 608 includes the fields grantor UID, grantee UID, push/pull, FIG, and value. The grantor UID identifies a subscriber who changed a field identified by the FID field to a value indicated in the value field. The update is available to the user identified in the grantee UID field on a push or pull basis, as indicated in the push/pull field. User data changes result in added records in the pending transaction log 608. User sync request associated with a pull transaction check cause the pending transaction log 608 to be checked for the grantee UID associated with the requesting pull transaction, and the data is provided if there is a match. Push transactions, on the other hand, push data from the pending transaction log 608 to the appropriate grantee.

The You service is based on peer to peer technology taking advantage of grid computing technologies to utilize free processor cycles to manage the traffic and updates. As of the drafting of this application, a service plugin has been developed for Microsoft Outlook 2002, 2002/XP and Microsoft Outlook Express as well as Mac OS X Mailer, Lotus Domino client, and Netscape Mail. You service client will also have a Java client on Microsoft Windows 98, ME, 2000, NT, or XP and Max OS 9, X, and Linux.

A personal profile that may be updated as described herein could include a wide variety of data fields including, by way of example but not limitation, name, important anniversaries, home address, business address, home phone, home fax, cell phone, business phone, business fax, personal email, business email, favorite charities, wish lists, clothing sizes, favorite colors, favorite wines, favorite foods, etc. Each field can be set as public, open to a number of users, or private. For example, you might make your cell phone available to all of your professional contacts, but only allow your spouse access to your wish lists. In addition, fields can be lumped into categories, such as personal or business, and users can be granted access based upon whether they are designated as personal or business contacts, for example.

Figure 7A:
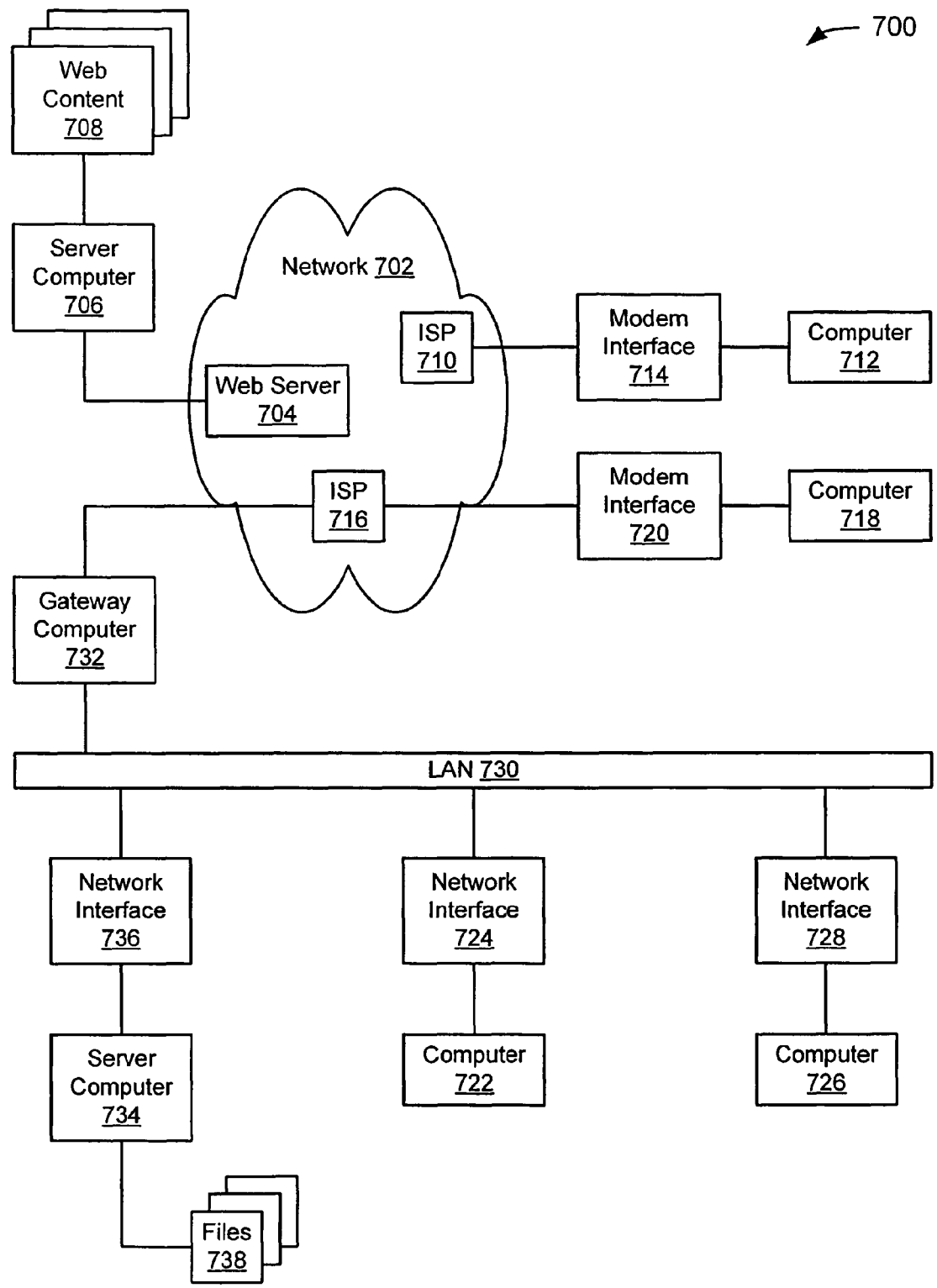
FIGS. 7A and 7B depict examples of systems on which a distributed management framework for personal attributes may be implemented.
Figure 7B:
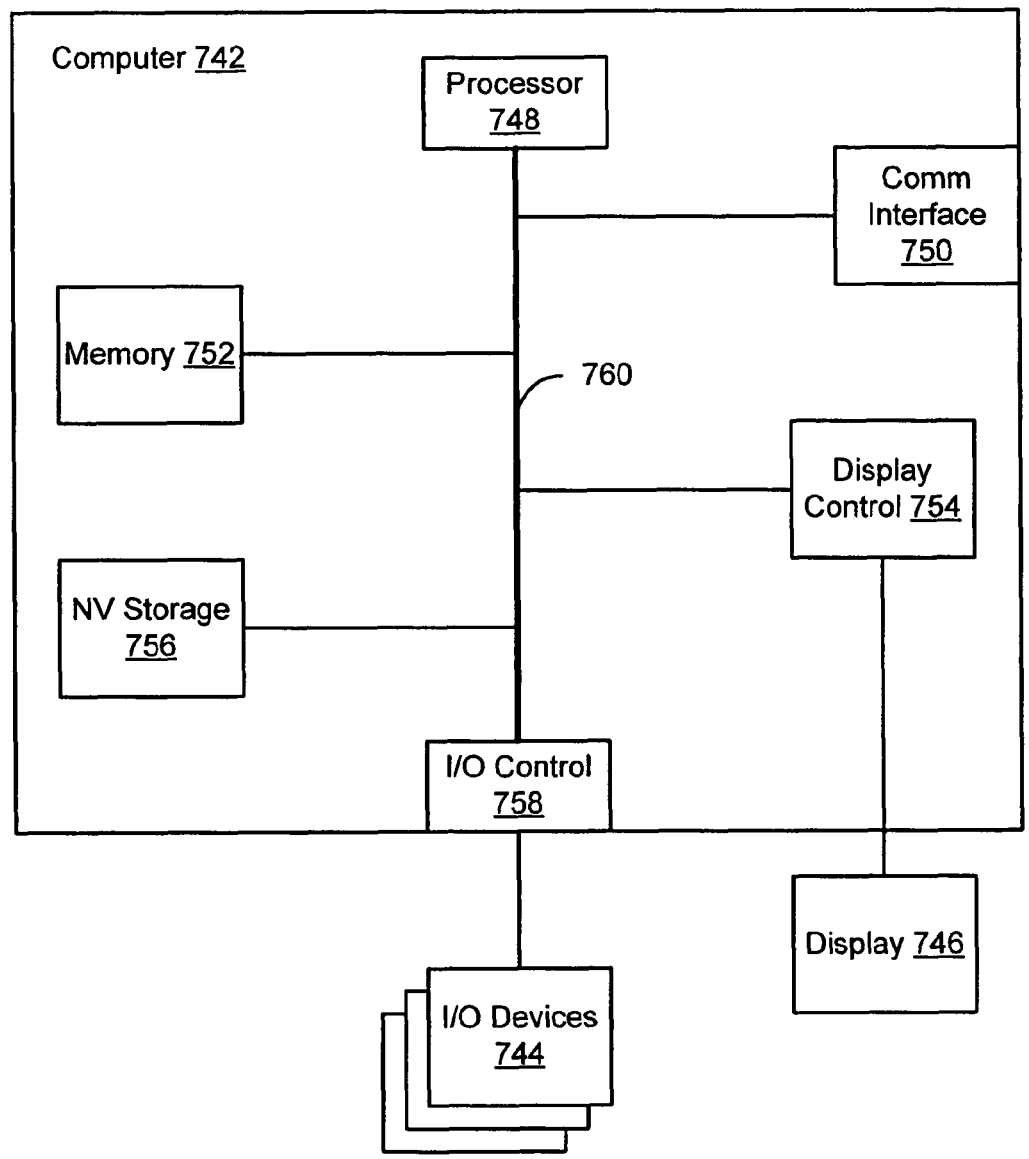

The following description of FIGS. 7A and 7B is intended to provide an overview of computer hardware and other operating components suitable for performing the methods of the invention described herein, but is not intended to limit the applicable environments. Similarly, the computer hardware and other operating components may be suitable as part of the apparatuses of the invention described herein. The invention can be practiced with other computer system configurations, including hand-held devices, multiprocessor systems, microprocessor-based or programmable consumer electronics, network PCs, minicomputers, mainframe computers, wireless devices, and the like. The invention can also be practiced in distributed computing environments where tasks are performed by remote processing devices that are linked through a communications network.

FIG. 7A depicts a system on which a distributed management framework for personal attributes may be implemented. FIG. 7A depicts a networked system 700 that includes several computer systems coupled together through a network 702, such as the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

The web server 704 is typically at least one computer system which operates as a server computer system and is configured to operate with the protocols of the world wide web and is coupled to the Internet. The web server system 704 can be a conventional server computer system. Optionally, the web server 704 can be part of an ISP which provides access to the Internet for client systems. The web server 704 is shown coupled to the server computer system 706 which itself is coupled to web content 708, which can be considered a form of a media database. While two computer systems 704 and 706 are shown in FIG. 7A, the web server system 704 and the server computer system 706 can be one computer system having different software components providing the web server functionality and the server functionality provided by the server computer system 706, which will be described further below.

Access to the network 702 is typically provided by Internet service providers (ISPs), such as the ISPs 710 and 716. Users on client systems, such as client computer systems 712, 718, 722, and 726 obtain access to the Internet through the ISPs 710 and 716. Access to the Internet allows users of the client computer systems to exchange information, receive and send emails, and view documents, such as documents which have been prepared in the HTML format. These documents are often provided by web servers, such as web server 704, which are referred to as being "on" the Internet. Often these web servers are provided by the ISPs, such as ISP 710, although a computer system can be set up and connected to the Internet without that system also being an ISP.

Client computer systems 712, 718, 722, and 726 can each, with the appropriate web browsing software, view HTML pages provided by the web server 704. The ISP 710 provides Internet connectivity to the client computer system 712 through the modem interface 714, which can be considered part of the client computer system 712. The client computer system can be a personal computer system, a network computer, a web TV system, or other computer system. While FIG. 7A shows the modem interface 714 generically as a "modem," the interface can be an analog modem, isdn modem, cable modem, satellite transmission interface (e.g. "direct PC"), or other interface for coupling a computer system to other computer systems.

Similar to the ISP 714, the ISP 716 provides Internet connectivity for client systems 718, 722, and 726, although as shown in FIG. 7A, the connections are not the same for these three computer systems. Client computer system 718 is coupled through a modem interface 720 while client computer systems 722 and 726 are part of a LAN 730.

Client computer systems 722 and 726 are coupled to the LAN 730 through network interfaces 724 and 728, which can be ethernet network or other network interfaces. The LAN 730 is also coupled to a gateway computer system 732 which can provide firewall and other Internet-related services for the local area network. This gateway computer system 732 is coupled to the ISP 716 to provide Internet connectivity to the client computer systems 722 and 726. The gateway computer system 732 can be a conventional server computer system.

Alternatively, a server computer system 734 can be directly coupled to the LAN 730 through a network interface 736 to provide files 738 and other services to the clients 722 and 726, without the need to connect to the Internet through the gateway system 732.

FIG. 7B depicts a computer system 740 for use in the system 700 (FIG. 7A). The computer system 740 may be a conventional computer system that can be used as a client computer system or a server computer system or as a web server system. Such a computer system can be used to perform many of the functions of an Internet service provider, such as ISP 710 (FIG. 7A).

In the example of FIG. 7B, the computer system 740 includes a computer 742, I/O devices 744, and a display device 746. The computer 742 includes a processor 748, a communications interface 750, memory 752, display controller 754, non-volatile storage 756, and I/O controller 758. The computer system 740 may be couple to or include the I/O devices 744 and display device 746.

The computer 742 interfaces to external systems through the communications interface 750, which may include a modem or network interface. It will be appreciated that the communications interface 750 can be considered to be part of the computer system 740 or a part of the computer 742. The communications interface can be an analog modem, ISDN modem, cable modem, token ring interface, satellite transmission interface (e.g. "direct PC"), or other interfaces for coupling a computer system to other computer systems.

The processor 748 may be, for example, a conventional microprocessor such as an Intel Pentium microprocessor or Motorola power PC microprocessor. The memory 752 is coupled to the processor 748 by a bus 760. The memory 752 can be dynamic random access memory (DRAM) and can also include static ram (SRAM). The bus 760 couples the processor 748 to the memory 752, also to the non-volatile storage 756, to the display controller 754, and to the I/O controller 758.

The I/O devices 744 can include a keyboard, disk drives, printers, a scanner, and other input and output devices, including a mouse or other pointing device. The display controller 754 may control in the conventional manner a display on the display device 746, which can be, for example, a cathode ray tube (CRT) or liquid crystal display (LCD). The display controller 754 and the I/O controller 758 can be implemented with conventional well known technology.

The non-volatile storage 756 is often a magnetic hard disk, an optical disk, or another form of storage for large amounts of data. Some of this data is often written, by a direct memory access process, into memory 752 during execution of software in the computer 742. One of skill in the art will immediately recognize that the terms "machine-readable medium" or "computer-readable medium" includes any type of storage device that is accessible by the processor 748 and also encompasses a carrier wave that encodes a data signal.

Objects, methods, inline caches, cache states and other object-oriented components may be stored in the non-volatile storage 756, or written into memory 752 during execution of, for example, an object-oriented software program. In this way, the components illustrated in, for example, FIGS. 1-6 can be instantiated on the computer system 740.

The computer system 740 is one example of many possible computer systems which have different architectures. For example, personal computers based on an Intel microprocessor often have multiple buses, one of which can be an I/O bus for the peripherals and one that directly connects the processor 748 and the memory 752 (often referred to as a memory bus). The buses are connected together through bridge components that perform any necessary translation due to differing bus protocols.

Network computers are another type of computer system that can be used with the present invention. Network computers do not usually include a hard disk or other mass storage, and the executable programs are loaded from a network connection into the memory 752 for execution by the processor 748. A Web TV system, which is known in the art, is also considered to be a computer system according to the present invention, but it may lack some of the features shown in FIG. 7B, such as certain input or output devices. A typical computer system will usually include at least a processor, memory, and a bus coupling the memory to the processor.

In addition, the computer system 740 is controlled by operating system software which includes a file management system, such as a disk operating system, which is part of the operating system software. One example of an operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 756 and causes the processor 748 to execute the various acts required by the operating system to input and output data and to store data in memory, including storing files on the non-volatile storage 756.

FIGS. 8A to 8F depict examples of components of a system capable of distributed management of personal attributes. The components depicted in the examples of FIGS. 8A to 8F could be combined in one system, such as the system depicted in FIG. 1, and a subset of the FIGS. 8A to 8F could be used. Other components, such as alternative configurations of clients, could be included in a system that includes all or a subset of the components depicted in FIGS. 8A to 8F. As there are many configurations, an exhaustive list of all possible client configurations has not been attempted, but one of skill in the art should recognize, using the six non-limiting examples provided, that alternatives are likely and that any known or convenient configuration could be used.

Figure 8A:
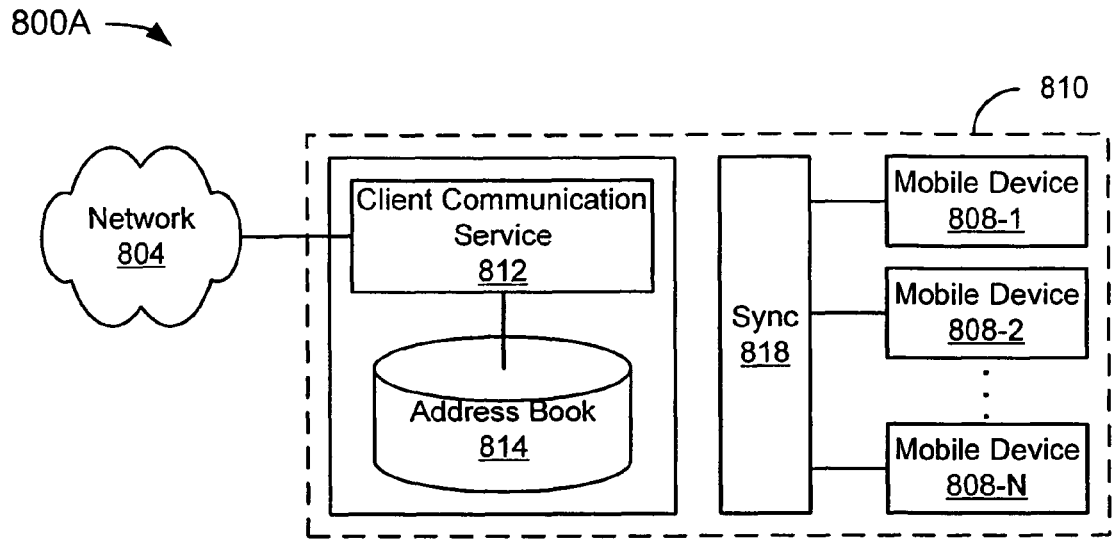
FIGS. 8A to 8F depict examples of components of a system capable of distributed management of personal attributes.

FIG. 8A depicts an example of a system 800A. The system 800A includes a network 804, and a client 810. The client 810 includes a client communication service 812, an address book 814, a sync module 818, and mobile devices 808-1 to 808-N (hereinafter, mobile devices 808). FIG. 8A is intended to illustrate that the client 810 may include personal attributes in, by way of example but not limitation, the address book 814, and that the client 810 can synchronize one or more mobile devices 808 with the personal attributes. The client communication service 812 may include a polling service, or some other push- or pull-model service.

Figure 8B:
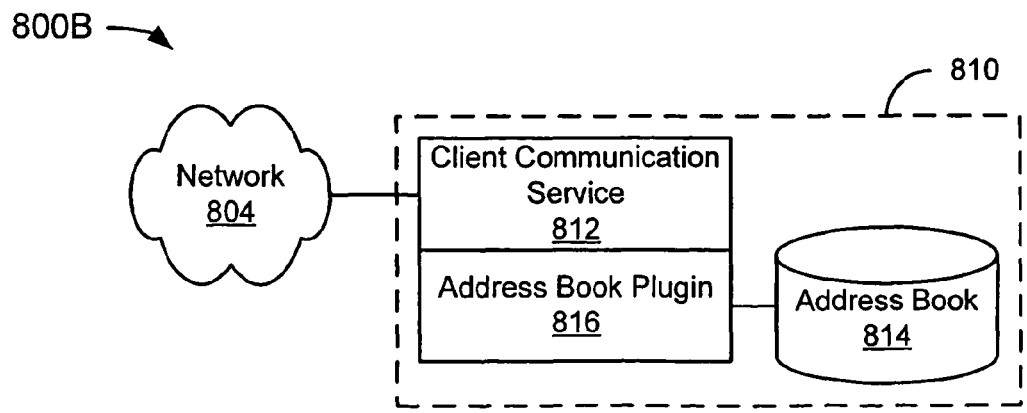

FIG. 8B depicts an example of a system 800B. The system 800B includes a network 804, and a client 810. The client 810 includes a client communication service 812, an address book 814, and an address book plugin 816. FIG. 8B is intended to illustrate that personal attributes in, by way of example but not limitation, the address book 814 may be accessible through the plugin 816.

Figure 8C:
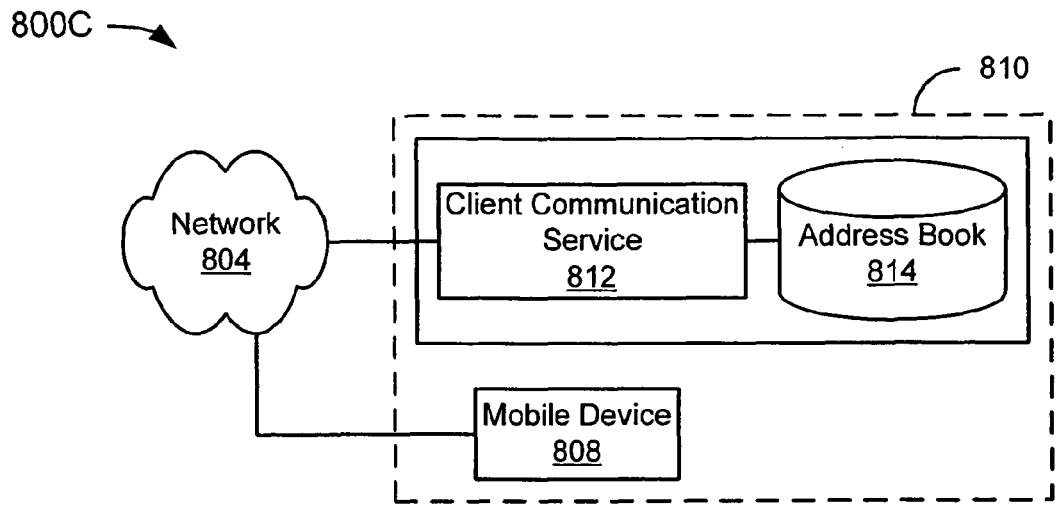

FIG. 8C depicts an example of a system 800C. The system 800C includes a network 804, and a client 810. The client 810 includes a client communication service 812, an address book 814, and a mobile device 808. Although only one is shown in the example of FIG. 8C, the client 810 could include any number of mobile devices. FIG. 8C is intended to illustrate that a client 810 may include a mobile device that is coupled to personal attributes via the network 804.

Figure 8D:
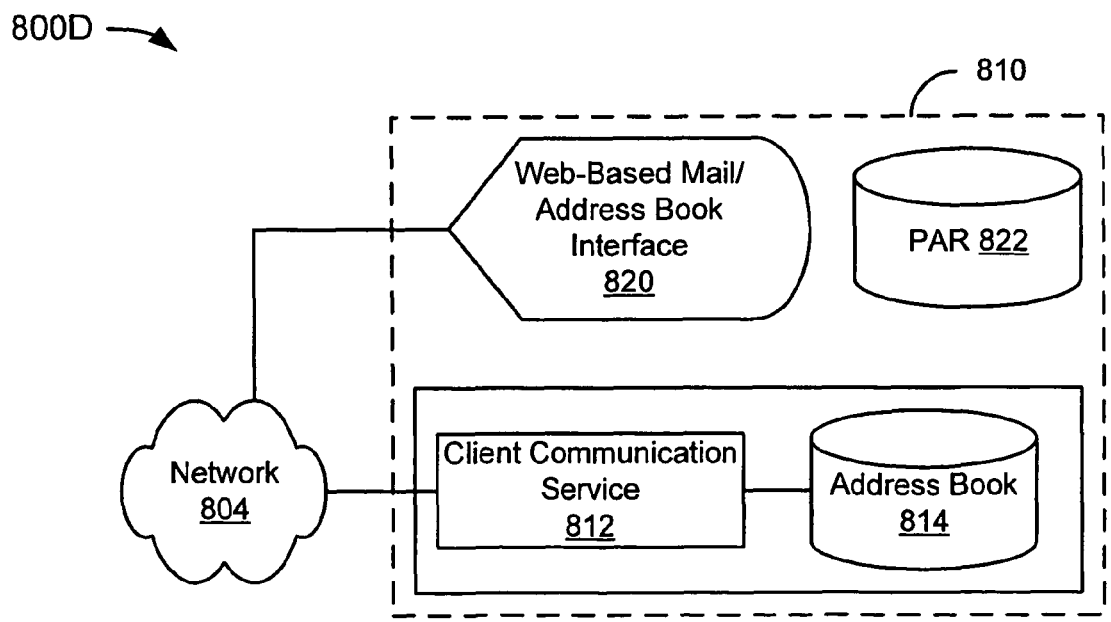

FIG. 8D depicts an example of a system 800D. The system 800D includes a network 804, and a client 810. The client 810 includes a client communication service 812, an address book 814, a web-based mail/address book interface 820, and a PAR database 822. The web-based mail/address book interface 820 may be one of a plurality of interfaces for a community of users. FIG. 8D is intended to illustrate that the client 810 may include a web-based mail/address book interface that is coupled to the client communication service 812 through the network 804. Examples of the system 810 include, by way of example but not limitation, Mozilla, Netscape 8, and Thunderbird.

Figure 8E:
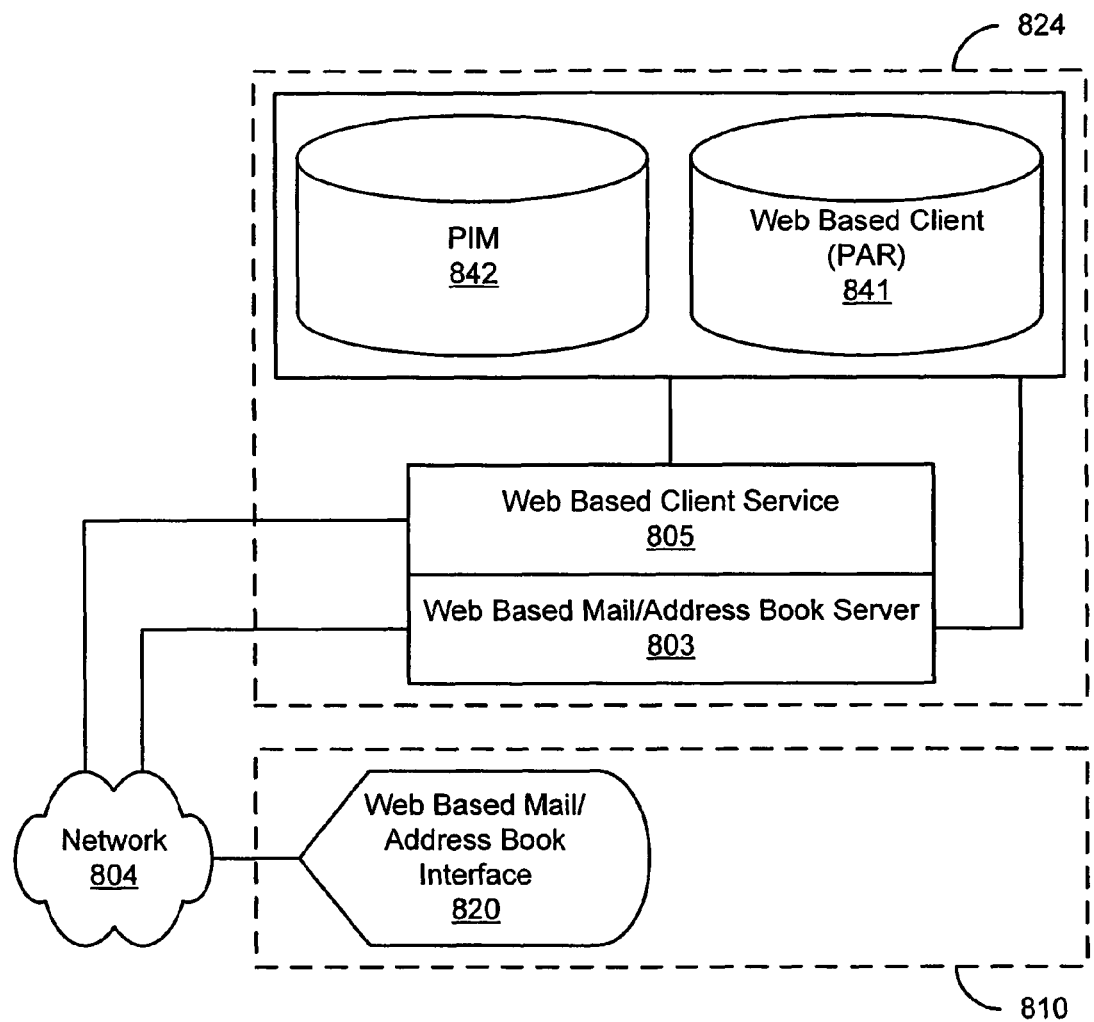

FIG. 8E depicts an example of a system 800E. The system 800E includes a network 804, a client 810, and a server 824. The client 810 includes a web based mail/address book server 803, a web based client service 805, a web based mail/address book interface 820, a web based client (PAR) database 841, and a backend mail and address book database 842. FIG. 8E is intended to illustrate that the client 810 may include a web-based mail/address book server, and that the client service may be web-based. It should be noted that although the example of FIG. 8E includes the PAR database 841, the system 800E is likely to also include a PIM database.

Figure 8F:
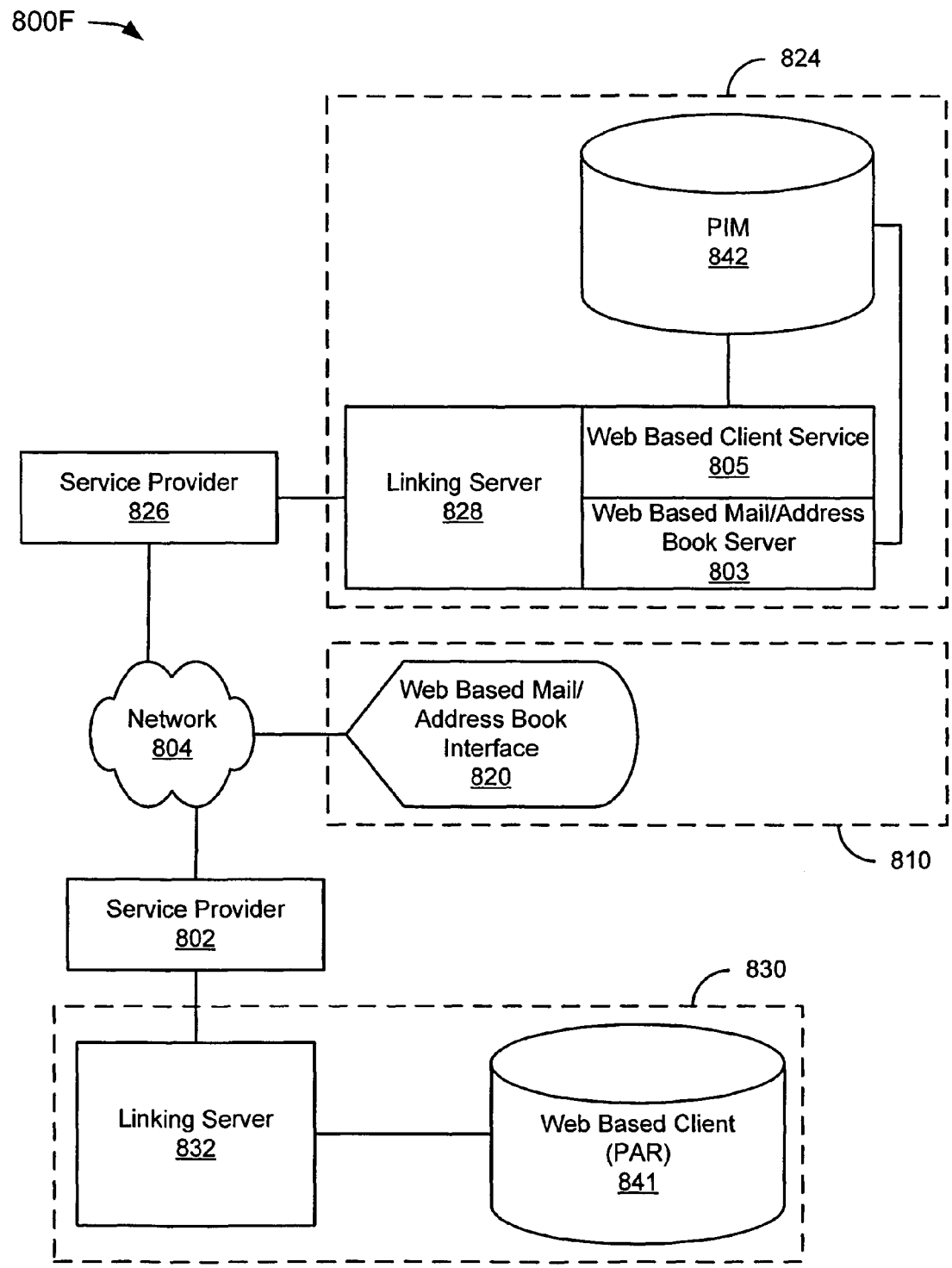

FIG. 8F depicts an example of a system 800F. The system 800F includes a service provider 802, a network 804, a client 810, a server 824, a service provider 826, and a server 830. The client 810 includes a web based mail/address book user 820. The server 824 includes a web based mail/address book server 803, a web based client service 805, and a backend mail and address book database 842. The server 830 includes a linking server 832 and a web based client (PAR) database 841. The service provider 826 couples the server 824 to the network 804. The service provider 802 couples the server 830 to the network 804. FIG. 8F is intended to illustrate that the web-based client (PAR) database 841 (FIG. 8E) can be coupled to the client 810 via the service provider 802 (FIG. 8F). It should be noted that although the example of FIG. 8F includes the PAR database 841, the system 800F is likely to also include a PIM database. In an alternative, the PAR database 841 could be distributed (e.g., part of the PAR database could be on the server 824).

Figure 9:
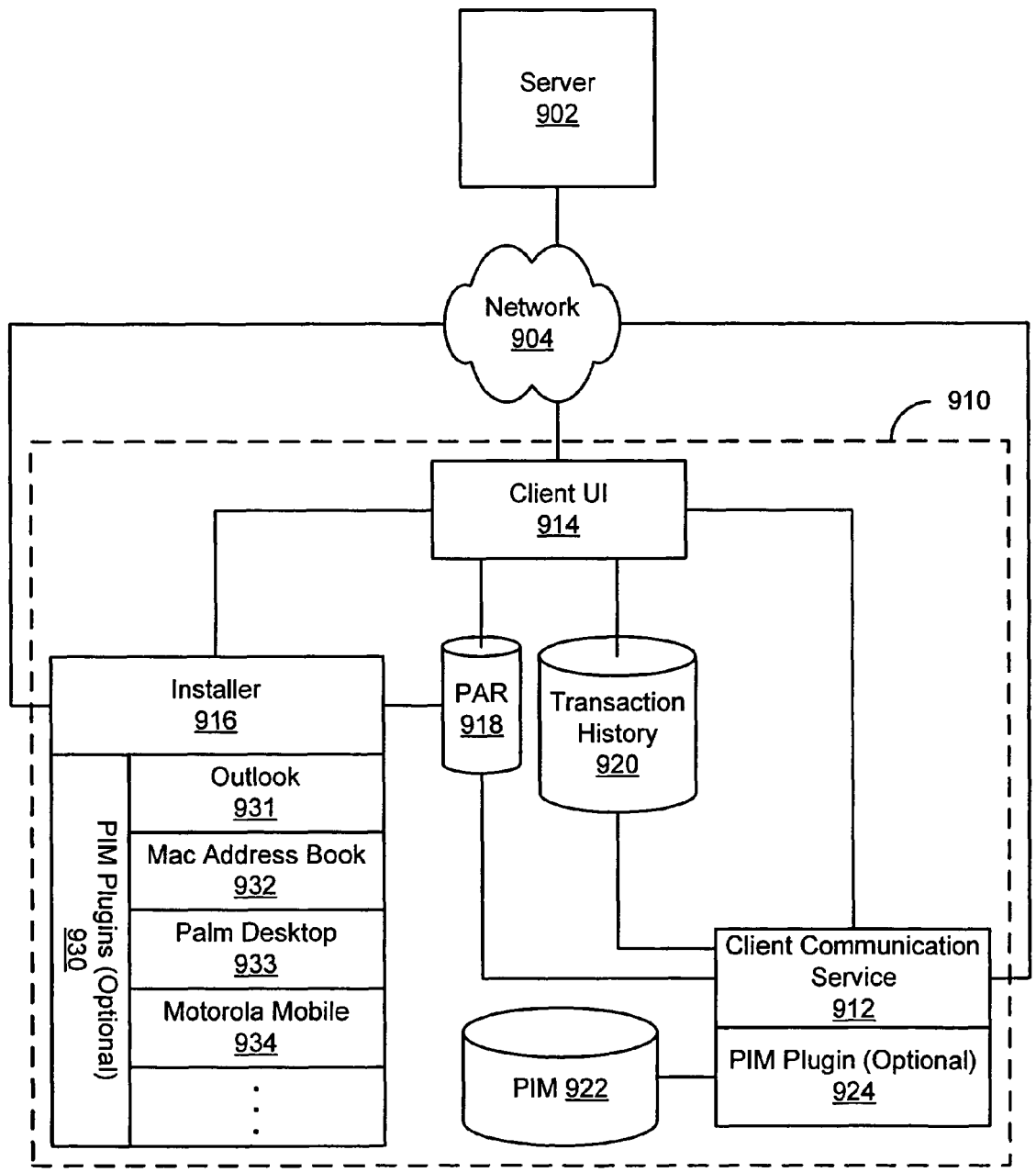
FIG. 9 depicts a system for distributed management of personal attributes.

FIG. 9 depicts a system 900 for distributed management of personal attributes. In the example of FIG. 9, the system 900 includes a server 902, a network 904, and a client 910. The server 902 may include communication APIs. The APIs may be categorized into logical groups, e.g., setup, permissions, authentication, personal attributes, communication, mobile devices, user, and error. The APIs are discussed later with reference to FIGS. 10 and 11.

In the example of FIG. 9, the network 904 couples the server 902 to the client 910. In the example of FIG. 9, the client 910 includes a client communication service module 912, a client UI module 914, an installer module 916, a PAR database 918, a transaction history database 920, and a PIM 922. The client communication service module 912 may or may not include an optional PIM plugin 924. The installer module 916 may or may not include optional PIM plugins 930 for Outlook 931, Mac Address book 932, Palm Desktop 933, Motorola Mobile 934, et al. (depicted for illustrative purposes only). Although only a single PIM is depicted in FIG. 9, multiple PIMs, such as address books or other databases, may be found on the client 910 in another embodiment.

Figure 10:
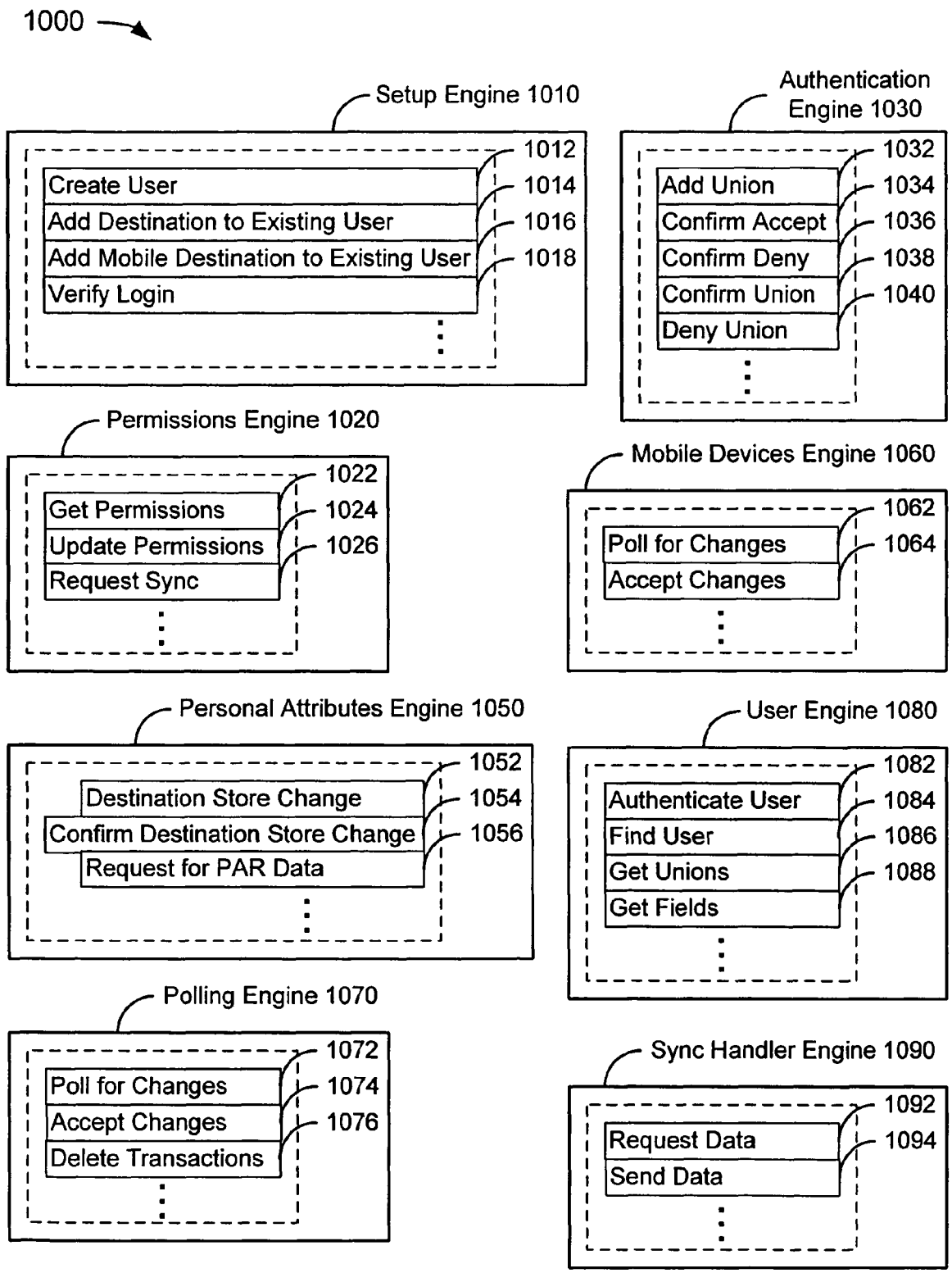
FIG. 10 depicts a conceptual view of engines and transactions associated with the system of FIG. 9.

FIG. 10 depicts a conceptual view 1000 of engines and transactions associated with the system of FIG. 9. In the example of FIG. 10, the conceptual view 1000 includes a setup engine 1010, a permissions engine 1020, an authentication engine 1030, a personal attributes engine 1050, a mobile devices engine 1060, a communications engine 1070, and a user engine 1080. In the embodiment described below, the engines use APIs. However, any known or convenient implementation would suffice. Examples of transactions associated with the engines, are described with reference to FIG. 11.

Figure 11:
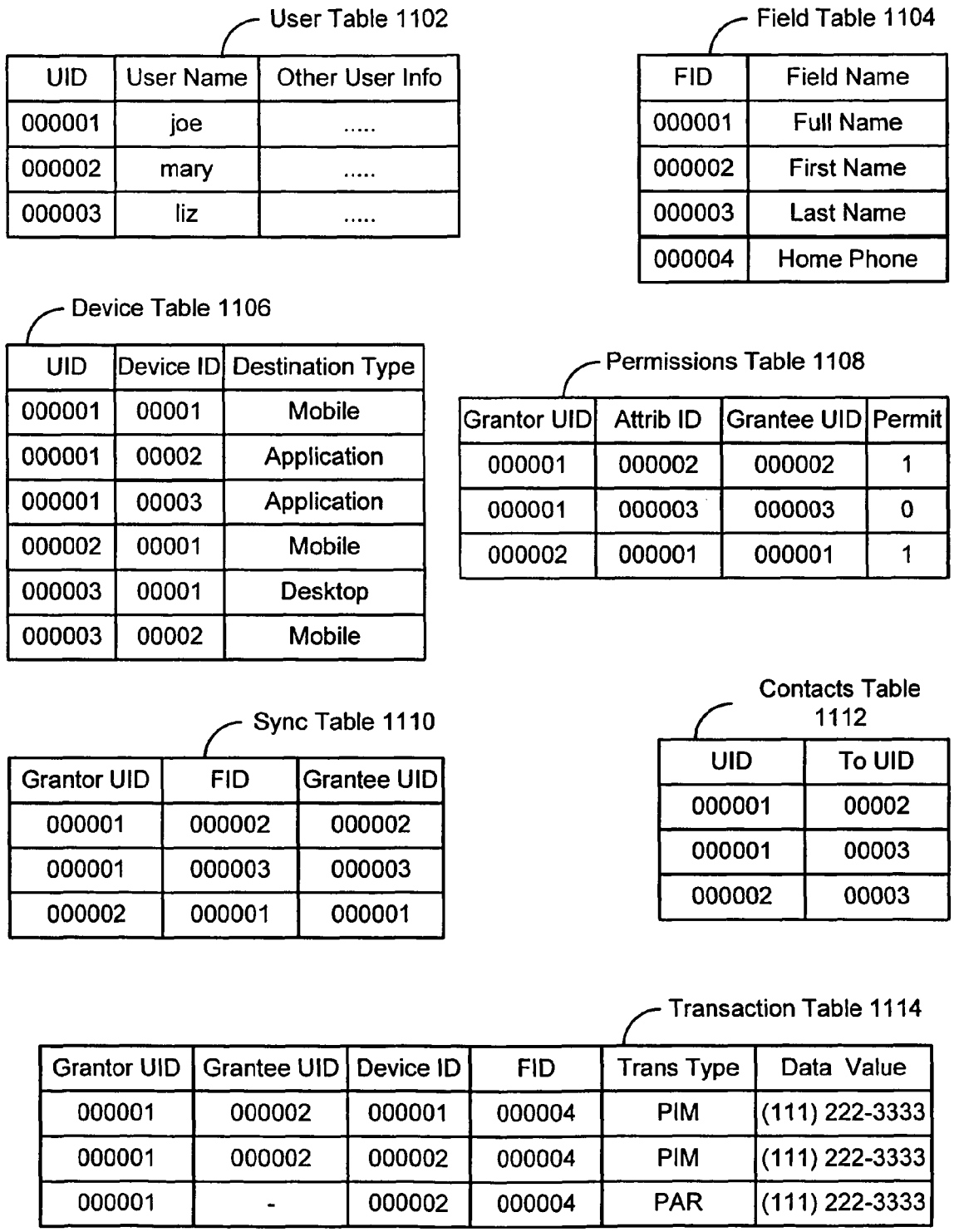
FIG. 11 depicts several examples of tables that may be included in a database of the system of FIG. 9.

FIG. 11 depicts several examples 1100 of tables that may be included in a database of the system of FIG. 9. The examples 1100 of tables include a user table 1102, a field table 1104, a device table 1106, a permissions table 1108, a sync table 1110, a contacts table 1112, and a transaction table 1114.

Referring once again to FIG. 10, four examples of transactions are associated with the setup engine 1010: create user API 1012, add destination to existing user API 1014, add mobile destination to existing user API 1016, and verify login API 1018. The create user API 1012 may include multiple parameters such as, by way of example but not limitation, username, password, firstname, lastname, and email. This API may result in an entry in the user table 1102. The add destination to existing user API 1014 may include parameters such as, by way of example but not limitation, username, password, destinationtype (which may be a physical device or a logical device), and destinationname. This API may result in an entry in the device table 1106. The add mobile destination to existing user API 1016 may include parameters such as, by way of example but not limitation, username, password, destinationtype, destinationname. This API may result in an entry in the device table 1106. The verify login API 1018 may include parameters such as, by way of example but not limitation, username and password.

In the example of FIG. 10, three examples of transactions are associated with the permissions engine 1020: get permissions API 1022, update permissions API 1024, and request sync API 1026. This group of APIs handles the management of a user's permissions. Permissions allow or disallow the sharing of data with other users. The get permissions API 1022 may include userid (uid) and deviceid parameters, and return a result with 0 . . . n permissions items. These permission items can be taken from the permissions table 1108. The update permissions API 1024 may include the parameters uid, deviceid, grantee id (gid), perm {field}, value {field}. The perm {field} has a value of '1' if permission is granted, and '0' if permission is not granted. This API should result in an entry in the permissions table 1108. It should be noted that there could be multiple levels of permissions other than just '0' or '1'. In any given implementation, any convenient number of permission levels could be used. The request sync API 1026 may include uid and device id parameters. This API may be used to sync data to a destination that might not have a full set of shared data. The server will handle where to get the data from and the results will be passed to the new destination.

In the example of FIG. 10, five examples of transactions are associated with the authentication engine 1030: add union API 1032, confirm accept API 1034, confirm deny API 1036, confirm union API 1038, and deny union API 1040. This group of APIs handles the management of user unions. The add union API 1032 may include the parameters uid, deviceid, and group ID (gid). The result of this API is an entry in the contacts table 1112. The confirm accept API 1034, confirm deny API 1036, confirm union API 1038, and deny union API 1040 may include the parameters uid, deviceid, and gid, and have predictable results.

In the example of FIG. 10, three examples of transactions are associated with the personal attributes engine 1050: destination store change API 1052, confirm destination store change API 1054, and request PAR data API 1056. This group of commands handles the management of a user's data values. These live within what is called a personal attribute record (PAR). The destination store change API 1052 may include the parameters uid, deviceid, and value {field id}. In an embodiment, multiple sets of {field id} data may be passed in a single set of parameters to the server. The server should be capable of creating an entry for the transaction table 1114. The confirm destination change API 1054 may include the parameters uid and deviceid, and has predictable results. The request for PAR data API 1056 may include the parameters uid, deviceid, and field {field id}. In an embodiment, multiple sets of {field id} data may be passed in a single set of parameters. In addition, if no sets of {field id} are passed, the server may initiate requests for all fields. This API should result in an entry in the transaction table 1114. Advantageously, the server can be asked to resend all data sent to a client, allowing repopulation of a PIM or destination store. In an embodiment, this is accomplished using a transaction history log to determine what information has been provided in the past.

In the example of FIG. 10, two examples of transactions is associated with the mobile devices engine 1060: poll for changes API 1062 and accept changes 1064. This group of commands handles checking the server periodically for changes. The parameters of the poll for changes API 1062 may include uid, deviceid, and version. The result should include one transaction id item if there is at least one transaction item. The result should contain 0 ... n transaction items from the transaction table 1114. The parameters of the accept changes API 1064 may include uid, deviceid, and version. The result should include one transaction id item if there is at least one transaction. In an embodiment, the accept changes API 1064 does not implement polling (e.g., it uses a push model).

In the example of FIG. 10, three examples of transactions are associated with the communications engine 1070: poll for changes API 1072, accept changes API 1074, and delete transactions API 1076. This group of commands handles checking the server periodically for changes. The poll for changes API 1072 and accept changes API 1074 are similar to the poll for changes API 1062 and accept changes API 1064, described previously. The delete transaction API 1074 may include the parameters uid, deviceid, and transaction id, and the results are predictable.

In the example of FIG. 10, four examples of transactions are associated with the user engine 1080: authenticate user API 1082, find user API 1084, get unions API 1086, and get fields API 1088. This group of commands handles the management of finding users. The parameters of the authenticate user API 1082 are uid and deviceid, and the results are predictable. The parameters of the find user API 1084 my include, by way of example but not limitation, uid, deviceid, username, firstname, and lastname, and the results are 0 ... n user items. The parameters of the get unions API 1086 are uid and deviceid, and the results are 0 ... n user items. The parameters of the get fields API 1088 are uid and deviceid, and the result will include 1 ... n group objects which include 1 ... n field objects. This API is used to get field data from the field table 1104 of the server, which is separated into field groups so the client can use this for display. This will also include the attributes for the fields.

The system may also include an error transaction (not shown), which can provide an error page with error results.

Figure 12:
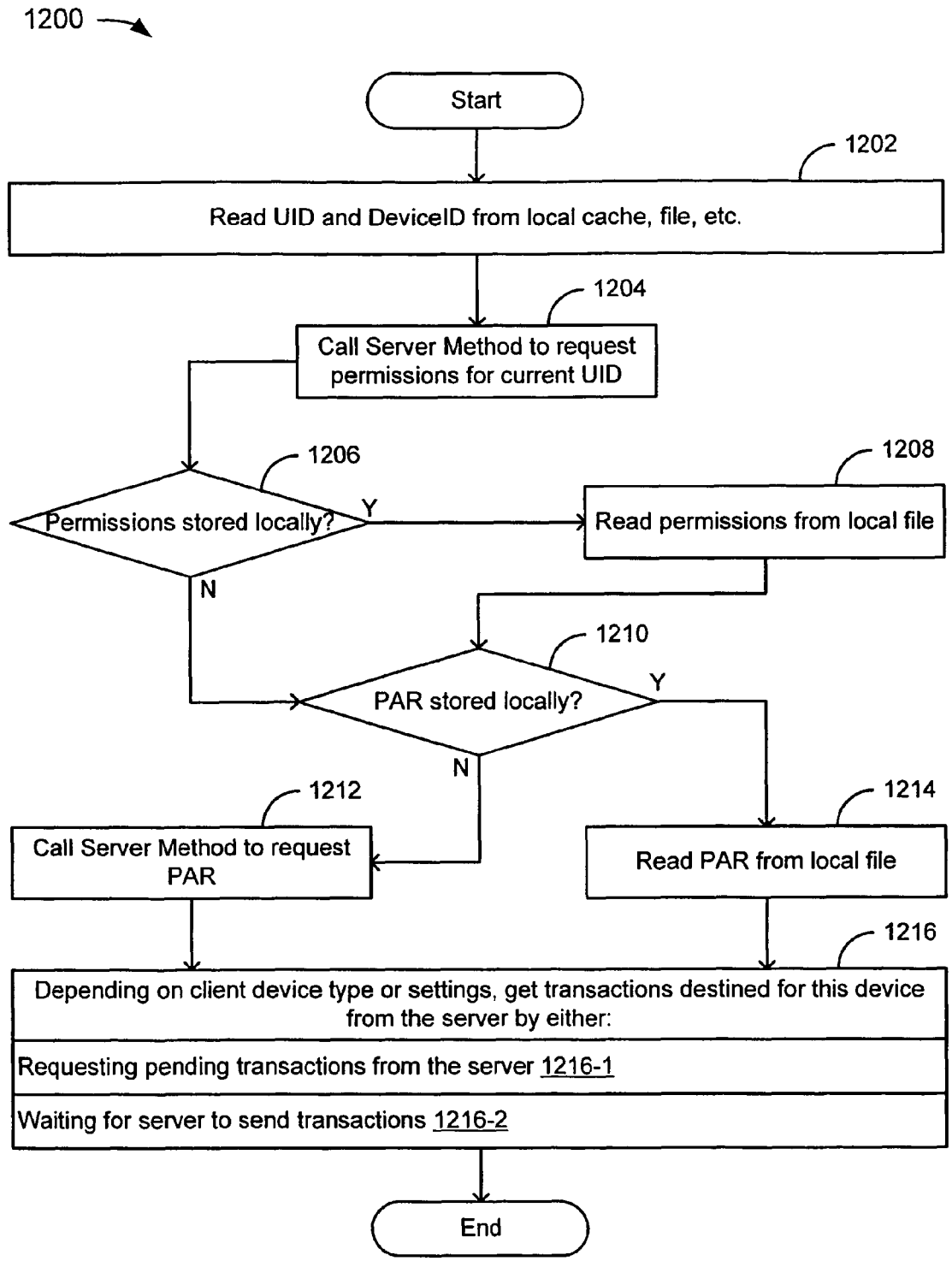
FIG. 12 depicts a flowchart of an example of a method for startup in a distributed management of personal attributes framework.

FIG. 12 depicts a flowchart 1200 of an example of a method for startup in a distributed management of personal attributes framework. In the example of FIG. 12, the flowchart 1200 starts at module 1202 with reading UID and DeviceID from local or remote cache, file, database, or the like. The flowchart 1200 continues at module 1204 with calling a server method to request permissions for the UID. If the server cannot be contacted, but permissions are stored locally (1206-Y), then the flowchart 1200 continues at module 1208 with reading permissions from a local file. In either case, the flowchart 1200 continues to decision point 1210 where it is determined whether PAR data is stored locally. If PAR data is not stored locally (1210-N), then the flowchart 1200 continues to module 1212 where a server method is called to request PAR data. If PAR data is stored locally (1210-Y), then the flowchart 1200 continues to module 1214 where PAR data is read from a local file. In either case, the flowchart 1200 continues to module 1216 where, depending on client device type or settings, transactions destined for this device are acquired from the server by either: (1216-1) requesting pending transactions from the server or (1216-2) waiting for the server to send the transactions.

Figure 13:
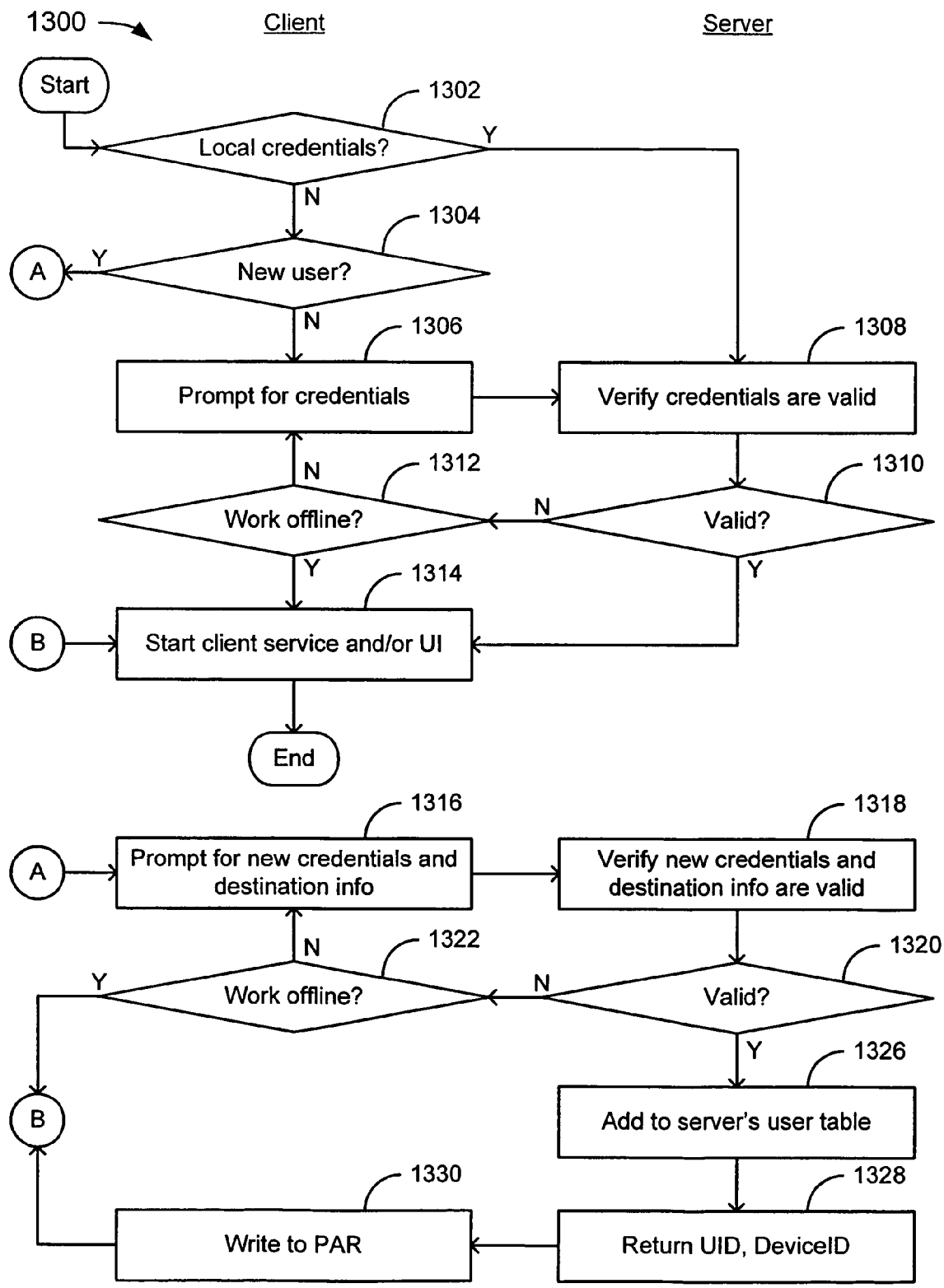
FIG. 13 depicts a flowchart of an example of a method for adding a user or device in a distributed management of personal attributes framework.

FIG. 13 depicts a flowchart 1300 of an example of a method for adding a user or destination in a distributed management of personal attributes framework. In the example of FIG. 13, the flowchart 1300 starts at decision point 1302 where it is determined whether credentials are stored locally. If the credentials are stored locally (1302-Y), then the flowchart 1300 continues to module 1308 where the server verifies that the credentials are valid. If the credentials are not stored locally (1302-N), then the flowchart 1300 continues to decision point 1304 where it is determined whether the user is a new user. The case where the user is a new user (1304-Y) is described later. If it is determined that the user is not a new user (1304-N), then the flowchart 1300 continues to module 1306 where the user is prompted for credentials at the client, and the flowchart 1300 continues to module 1308 where the server verifies that the credentials are valid. The flowchart 1300 continues from the module 1308 to decision point 1310 where it is determined whether the credentials are valid. If the credentials are valid (1310—Y), then the flowchart 1300 ends at module 1314 where a client communications service and/or UI is started. In an alternative, the client service may already be running, obviating the need to start the client service at module 1314. This may allow multiple clients to connect through a single client service (e.g., a linking server). If the credentials are not valid (1310-N), then the flowchart 1300 continues to decision point 1312 where it is determined whether the client intends to work offline. If the client does not intend to work offline (1312-N), then the flowchart continues from module 1306 as described previously. If the client intends to work offline (1312—Y), then the flowchart 1300 ends at module 1314 as described previously.

Returning once again to decision point 1304, if it is determined that the user is a new user (1304-Y), then the flowchart 1300 continues to module 1316 where the client is prompted for new credentials and destination information. The flowchart 1300 continues to module 1318 where the server verifies the new credentials and destination information are valid. The flowchart 1300 continues to decision point 1320 where it is determined whether the new credentials and destination information are valid. If it is determined that the new credentials and destination information are not valid (1320-N), then the flowchart continues to decision point 1322 where it is determined whether the client intends to work offline (if not, the flowchart 1300 continues to module 1316 as described previously; if so, the flowchart 1300 continues to module 1314 as described previously). If it is determined that the new credentials and destination information are valid (1320-Y), then the flowchart 1300 continues to module 1326 where the user is added to the server's user table, to module 1328 where the server returns UID and Device ID, to module 1330 where the client writes the data to PAR, and to module 1314, which was described previously.

Figure 14:
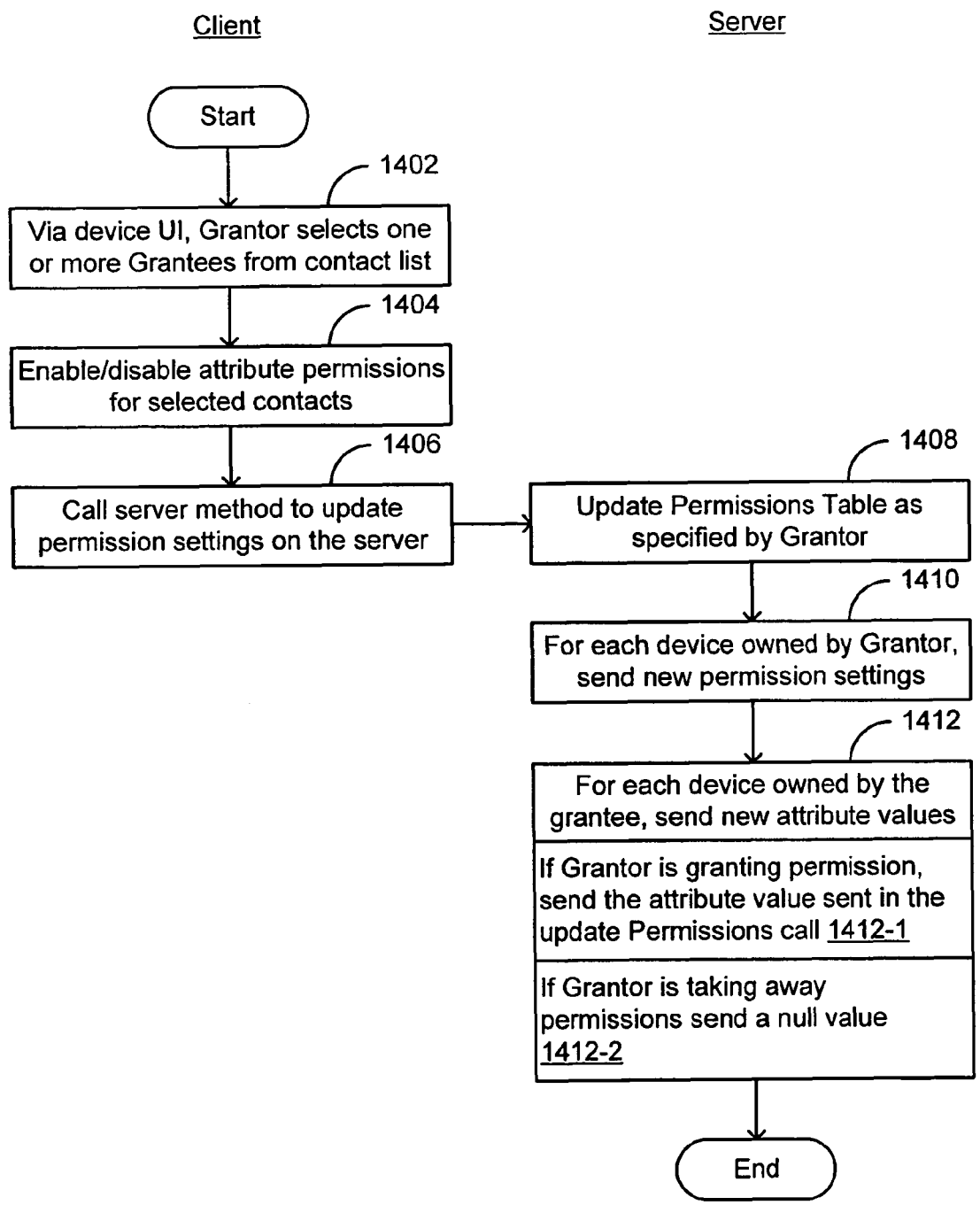
FIG. 14 depicts a flowchart of an example of a method for setting permissions in a distributed management of personal attributes framework.

FIG. 14 depicts a flowchart 1400 of an example of a method for setting permissions in a distributed management of personal attributes framework. In the example of FIG. 14, the flowchart 1400 starts at module 1402 where a grantor selects via destination UI one or more grantees from a contact list. The flowchart 1400 continues to module 1404 where the user enables or disables attribute permissions for selected contacts. The flowchart 1400 continues to module 1406 where a server method is called to update permission settings on the server. The flowchart 1400 continues to module 1408 where the server updates a permissions table as specified by the grantor. The flowchart 1400 continues to modules 1410 where for each destination owned by the grantor a new permission setting is sent. The flowchart 1400 ends at module 1412 where for each device owned by the grantee new attribute values are sent and (1412-1) if the grantor is granting permission, the attribute value sent at module 1408 is sent and (1412-2) if the grantor is taking away permissions, a null value is sent.

Figure 15A:
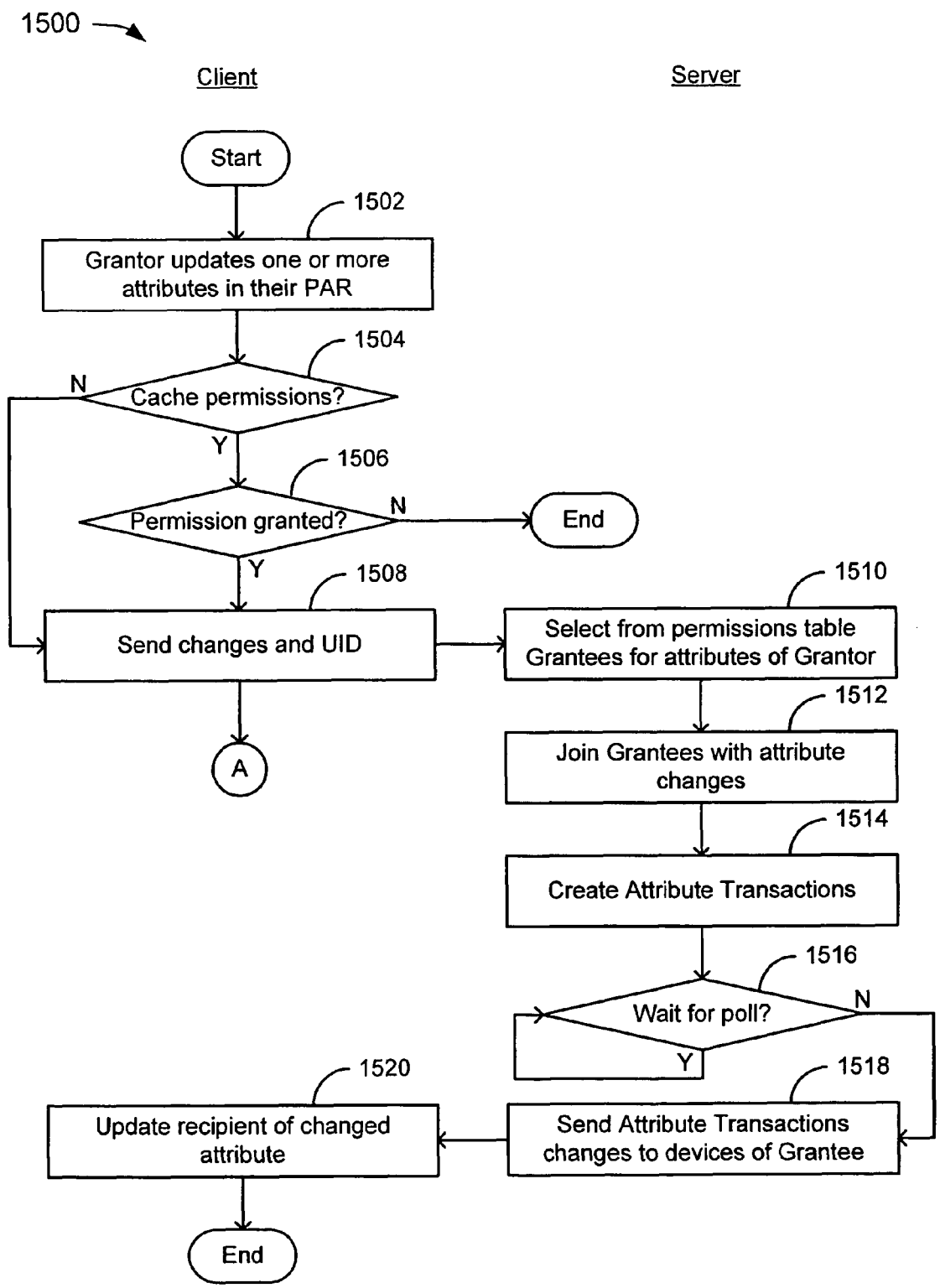
FIGS. 15A and 15B depict a flowchart of an example of a method for changing attributes in a distributed management of personal attributes framework.
Figure 15B:
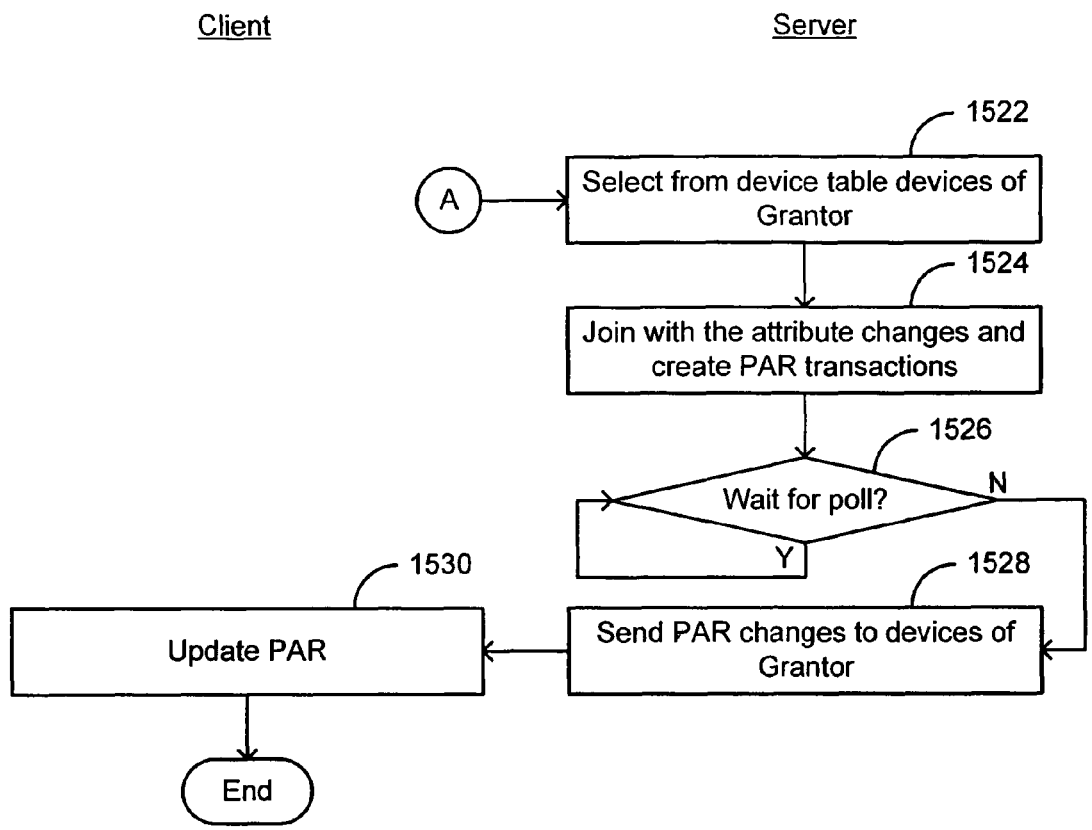

FIGS. 15A and 15B depict a flowchart 1500 of an example of a method for changing attributes in a distributed management of personal attributes framework. In the example of FIG. 15A, the flowchart 1500 starts at module 1502 whether a grantor updating one or more attributes in their PAR. The flowchart 1500 continues to decision point 1504 where it is determined whether permissions have been cached. If permissions have been cached (1504-Y), then the flowchart 1500 continues to decision point 1506 where it is determined whether permission has been granted (if not, the flowchart 1500 ends; if so, the flowchart 1500 continues to module 1508). If permissions have not been cached (1504-Y), then the flowchart 1500 continues to module 1508 where changes and UID are sent from the client to the server.

In the example of FIG. 15A, the flowchart 1500 continues to module 1510 where grantees for attributes of the grantor are selected from a permissions table, to module 1512 where grantees are joined with attribute changes, and to module 1514 where attribute transactions are created. The flowchart 1500 continues to decision point 1516 where it is determined whether to wait for polling. If it is determined that the server should wait for polling (1516-Y), then the flowchart 1500 repeats decision point 1516 until it is determined that polling occurred. If it is determined that the server should not wait for polling (1516-N), or that polling has occurred, then the flowchart 1500 continues to module 1518 where attribute transactions changes are sent to devices of the grantee (e.g., linking server). It should be noted that although the term "sent" is used, if the client is polling, then the transaction is actually a pull transaction, rather than a push/send. The flowchart 1500 ends at 1520 with the client updating the recipient of the changed attribute.

In the example of FIG. 15A, after changes and UID are sent from the client to the server at module 1508, the flowchart continues at module 1510 as described, but also continues to module 1522 (FIG. 15B) where a device of the grantor is selected from the device table at the server. The flowchart 1500 continues module 1524 where the server joins with the attribute changes and create PAR transactions. The flowchart 1500 continues to decision point 1526 where the server waits for polling (or not) and to module 1528 where PAR changes are sent to devices of the grantor. The flowchart 1500 ends at module 1530 with updating PAR.

Figure 16:
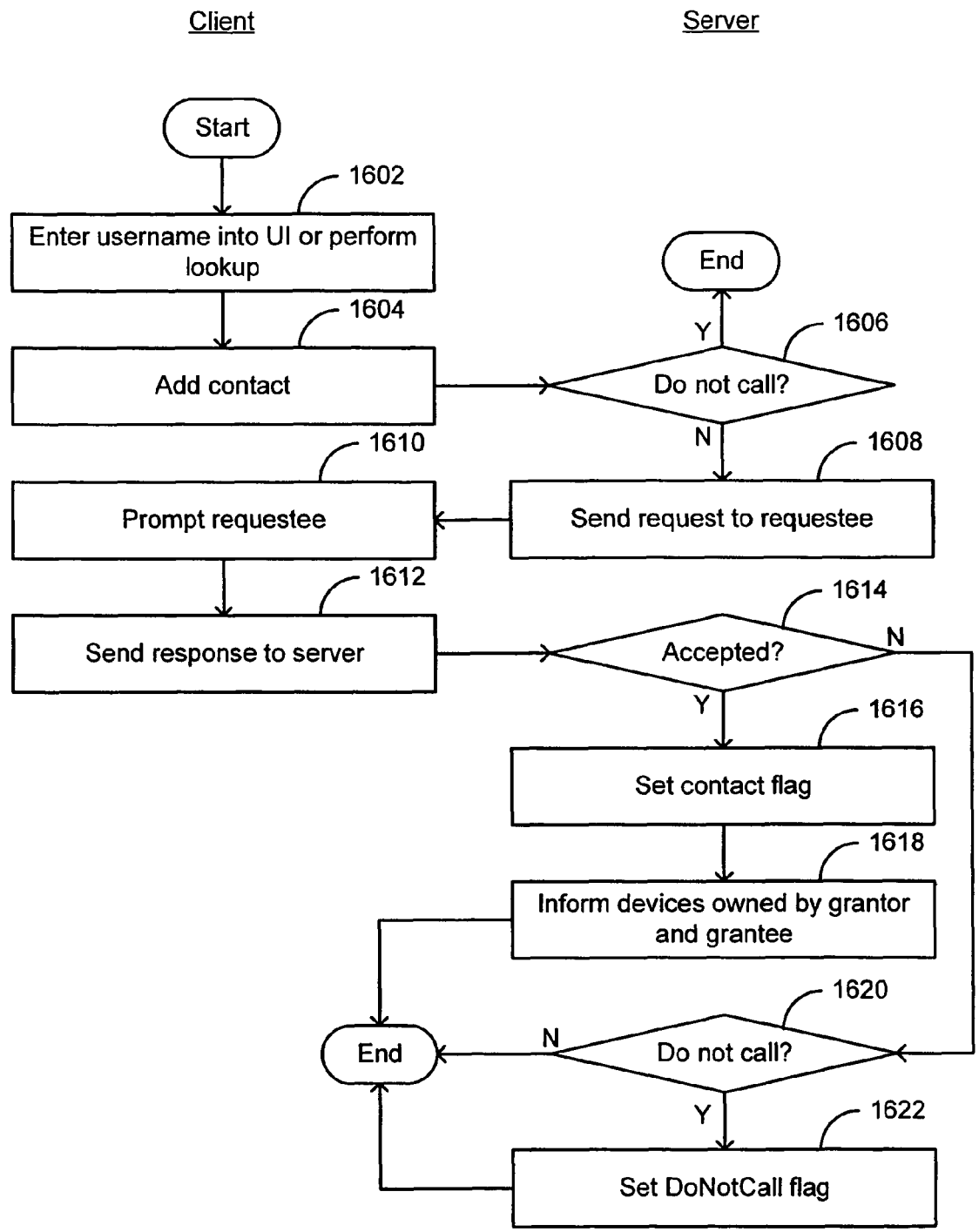
FIG. 16 depicts a flowchart of an example of a method for making connections in a distributed management of personal attributes framework.

FIG. 16 depicts a flowchart 1600 of an example of a method for making connections in a distributed management of personal attributes framework. In the example of FIG. 16, the flowchart 1600 starts at module 1602 where a requester enters a username into a UI or a lookup is performed at a client. The flowchart 1600 continues to module 1604 where a contact is added at the client. The flowchart 1600 continues to decision point 1606 where it is determined whether the requestee has the requester on a do not call list. If so (1606-Y), the flowchart ends and the requestor may or may not receive notification. If not (1606-N), then the server sends a request to the requestee. The flowchart 1600 continues to modules 1610 where the requestee is prompted, and to module 1612 where the requestee sends a response to the server.

In the example of FIG. 16, the flowchart 1600 continues to decision point 1614 where it is determined whether the requestee accepted the request. If so (1614-Y), then the flowchart 1600 continues to module 1616 where the contact flag is set at the server, and the flowchart 1600 ends at module 1618 where devices owned by grantor and grantee are informed. If not (1614-N), then the flowchart 1600 continues to decision point 1620 where it is determined whether the requestee not only declines the request but also adds the requestor to a do not call list. If it is determined that the requestor is not to be added to the do not call list (1620-N) then the flowchart 1600 ends with the requestee not honoring the request. If it is determined that the requestor is to be added to the do not call list (1620-Y) then the flowchart 1600 ends at module 1622 with setting the do not call flag.

Figure 17:
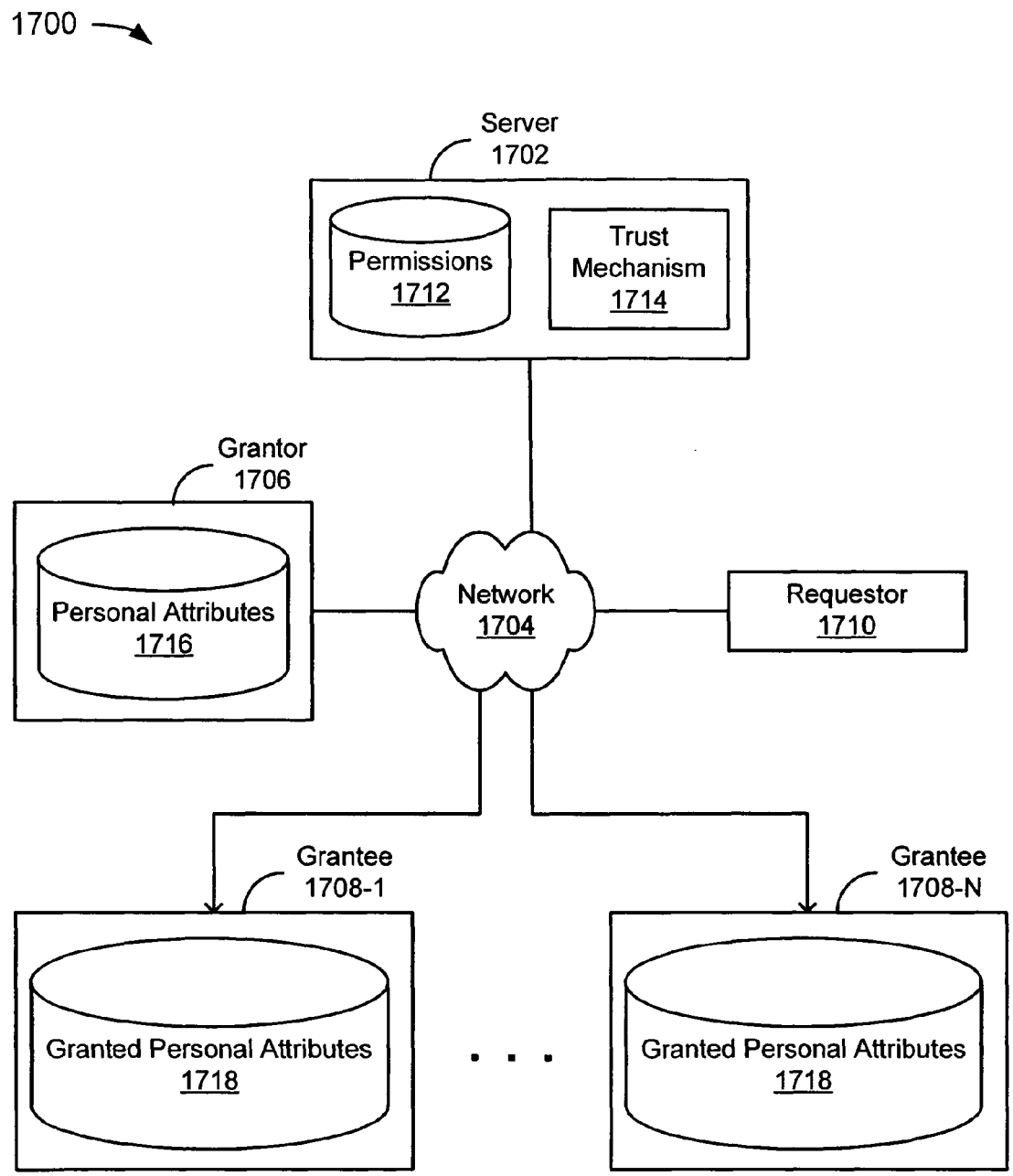
FIG. 17 depicts an example of a system for distribution of personal data.

Having described in some detail multiple examples of a system for distribution of personal data, an example of a system for distribution of personal data as depicted in FIG. 17 should be readily understandable. FIG. 17 depicts an example of a system 1700 for distribution of personal data. In the example of FIG. 17, the system 1700 includes a server 1702, a network 1704, a grantor 1706, grantees 1708-1 to 1708-N (hereinafter referred to collectively as grantees 1708), and a requestor 1710. The server 1702 includes a permissions database 1712 and a trust mechanism 1714. The trust mechanism 1714 may be implemented in a number of ways. For example, the trust mechanism 1714 may attempt to verify whether data is coming from the source (e.g., the grantor 1706). If that is not possible, the trust mechanism 1714 may attempt to verify a local signed copy. If that is not possible, the trust mechanism 1714 may attempt to verify data by comparing two third parties (since it is more likely that if two third parties have identical data, that data is valid). This is but an example of a trust mechanism procedure, but any known or convenient procedure could be used. The grantor 1706 includes a personal attributes database 1716. The grantees 1708 each include personal attributes databases 1718-1 to 1718-N (hereinafter referred to collectively as granted personal attributes database 1718). The grantees 1708 may or may not be agents that have significant data stores of personal information. The granted personal attributes database 1718 may include a PIM, such as, by way of example but not limitation, an address book.

In the example of FIG. 17, the grantor 1706 has presumably granted permission to some or all of the grantor's personal attributes to the grantees 1708. The permissions are stored in the permissions database 1712. In an embodiment, the server 1702 does not include any of the personal attributes. Advantageously, this reduces the burden on the server 1702 to store large amounts of data. Also, since the server 1702 in this embodiment does not include personal data, data mining at the server (either through hacking or more legitimate means) can be less harmful.

In the example of FIG. 17, in operation, the requestor 1710 asks for permission to access some or all of the grantor's personal attributes. Alternatively, the grantor may choose to share with the grantee (e.g., without receiving a request). The grantor 1706 or an agent of the grantor 1706 may grant permission (or permission may be granted automatically for public data, or permission may be granted in advance). Once the requester 1710 has been granted permission, the server 1702 will attempt to obtain the information on behalf of the requestor 1710. However, the personal attributes database 1716 may or may not be available. For example, the grantor 1706 may have turned off the machine on which the personal attributes database 1716 is stored, or may have lost connectivity, or the personal attributes database 1716 may not be accessible for some other reason. Advantageously, the server 1702 can access the permissions database 1712 to determine which grantee has been given permission to which information. Since the server 1702 knows which grantee has been given permission to which information, the server 1702 can facilitate providing the requester 1710 with the information from the granted personal attributes database 1718. In some cases, such as when a person switches off a computer with personal attributes and goes on vacation, the system 1700 can provide the requester 1710 with requested data in a matter of minutes, instead days or even months.

Figure 18:
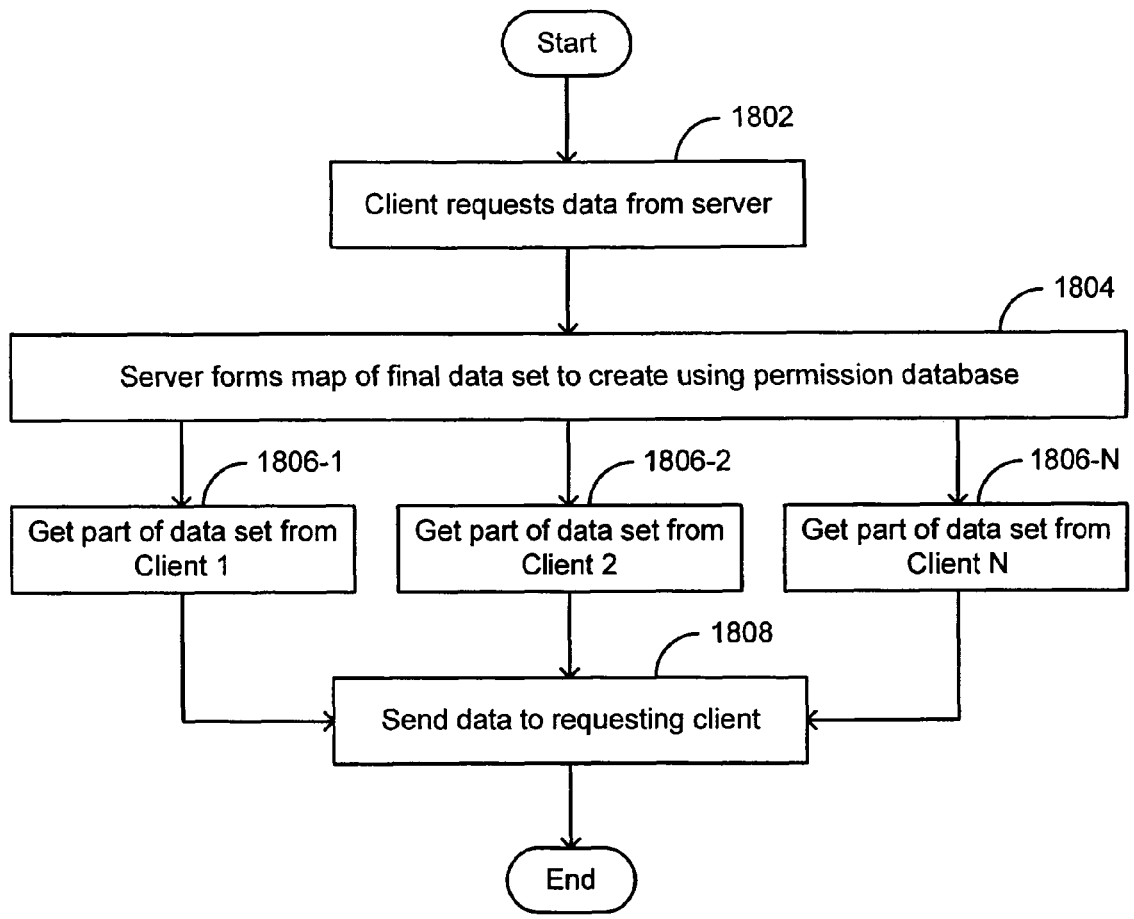
FIG. 18 depicts a flowchart of an example of a method for obtaining personal data from a plurality of grantees.

FIG. 18 depicts a flowchart 1800 of an example of a method for obtaining personal data from a plurality of grantees. In the example of FIG. 18, the flowchart 1800 starts at module 1802 where a client requests data from a server. The flowchart 1800 continues at module 1804 where the server forms a map of the final data set to create using a permissions database. The permissions database may include a table that identifies a grantor, a grantee, and an attribute for which permission is granted. A grantor may grant permission to different personal information for any reason.

In the example of FIG. 18, the flowchart 1800 continues at modules 1806-1 to 1806-N where parts of the requested data are obtained from clients 1 to N. It may be that the data cannot be obtained from a single client because that client was not granted permission to the same data. Also, it may be that a client changed a field that was controlled by the grantor so the new data cannot be trusted (and a different client must be contacted to get the trusted data). There could be any number of reasons why multiple clients provide different parts of the requested data.

In the example of FIG. 18, the flowchart 1800 continues at module 1808 where the data is sent back to the requesting client. The data may be assembled at the server, or the data could be sent directly. The server may or may not be notified by the requesting client when all data is received. The server may or may not be notified by the sending clients in an embodiment where the server does not assemble the data for transmission to the requesting client.

Advantageously, a user who loses data can repopulate the data using this technique. For example, if a user's email program became corrupted or otherwise lost data, the user would be able to reinstall and repopulate. The user could even repopulate personal data so long as another user or device had access to the data. In addition, a user who begins using a new device, but who does not have access to another device with personal data stored thereon, can populate the new device using this technique. Users who attempt to change data that was received from another user might be doing so unintentionally. Such users could receive a warning that they are changing data that is controlled by another user (and asked whether they really want to change the data).

It may be desirable to include a transaction log of events that cause data to be stored locally in a PIM, log, or database. The transaction log can serve as a snapshot of the state of the personal attributes on a client. The transaction log can be useful for speeding repopulation if all of the data is needed again. Moreover, the transaction log could be searched to determine who controls what data, times when the controller of data updated the data, or some other information.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or, advantageously, it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the present invention is not described with reference to any particular programming language, and various embodiments may thus be implemented using a variety of programming languages.

While this invention has been described by way of example in terms of certain embodiments, it will be appreciated by those skilled in the art that certain modifications, permutations and equivalents thereof are within the inventive scope of the present invention. It is therefore intended that the following appended claims include all such modifications, permutations and equivalents as fall within the true spirit and scope of the present invention; the invention is limited only by the claims.

What is claimed is:

1. A method comprising:
   primarily storing shared attributes in a distributed fashion at a plurality of entities, wherein first attributes of the shared attributes are maintained at a first entity of the plurality of entities and second attributes of the shared attributes are maintained at a second entity of the plurality of entities;
   linking the first entity with the second entity;
   providing first destinations, associated with the first entity, for the second attributes;
   granting first permissions for the first attributes to the second entity;
   providing second destinations, associated with the second entity, for the first attributes;
   granting second permissions for the second attributes to the first entity;
   facilitating propagation of the shared attributes to the first destinations through the second permissions and to the second destinations through the first permissions;
   managing subsequent changes of the shared attributes while avoiding centrally stored shared attributes to create a syndicated distributed secure data exchange.

2. The method of claim 1, further comprising:
   reading user ID and device ID from a local cache;
   if permissions are not stored locally, calling a server method to request permissions for the user ID;
   if permissions are stored locally, reading permissions from a local file.

3. The method of claim 1, further comprising:
   calling a server method to request a personal attribute record (PAR) if the PAR is stored remotely;
   reading the PAR from a local file if the PAR is stored locally.

4. The method of claim 1, further comprising:
   getting transactions by either requesting pending, transactions from a server or waiting for the server to send the transactions.

5. The method of claim 1, further comprising:
   selecting one or more grantees from a contact list;
   enabling attribute permissions for selected contacts;
   calling a server method to update permission settings on a server.

6. The method of claim 1, further comprising:
   updating a permissions table as specified by a grantor;
   for each new device owned by the grantor, sending new permission settings;
   for each device owned by a grantee, sending new attribute values;
   if the grantor is granting permission, sending the attribute value sent in an update permissions call;
   if the grantor is taking away permissions, sending a null value.

7. The method of claim 1, further comprising:
   selecting from a permissions table grantees for attributes of a grantor;
   joining grantees with the attribute changes;
   creating attribute transactions;
   sending attribute transactions changes to destinations associated with the grantees.

8. The method of claim 1, further comprising:
   selecting from a device table devices of a grantor;
   joining grantees with the attribute changes;
   creating personal attribute record (PAR) transactions;
   sending PAR changes to destinations associated with the grantor.

9. The method of claim 1, wherein the first entity comprises a mobile device, and the second entity comprises a mobile device.

10. A system, comprising:
    an attribute datastore to primarily store shared attributes in a distributed fashion at a plurality of entities, wherein first attributes of the shared attributes are maintained at a first entity of the plurality of entities and second attributes of the shared attributes are maintained at a second entity of the plurality of entities;
    a destination datastore to store a first destination associated with the first entity and a second destination associated with the second entity;
    a permissions datastore to store first permissions, second permissions, and shared permissions comprising a subset of the first permissions and a subset of the second permissions;
    a server database engine comprising a processor and a memory;
    wherein, in operation, the server database engine:
      links the first entity with the second entity;
      provides first destinations, associated with the first entity, for the second attributes;
      grants first permissions for the first attributes to the second entity;
      provides second destinations, associated with the second entity, for the first attributes;
      grants second permissions for the second attributes to the first entity;
      facilitates the propagation of the shared attributes to the first destinations through the second permissions and to the second destinations through the first permissions;
      manages subsequent changes of the shared attributes while avoiding centrally stored shared attributes to create a syndicated distributed secure data exchange.

11. The system of claim 10, wherein, in operation, the server database engine:
    reads user ID and device ID from a local cache;
    if permissions are not stored locally, calls a server method to request permissions for the user ID;
    if permissions are stored locally, reads permissions from a local file.

12. The system of claim 10, wherein, in operation, the server database engine:
    calls a server method to request a personal attribute record (PAR) if the PAR is stored remotely;
    reads the PAR from a local file if the PAR is stored locally.

13. The system of claim 10, wherein, in operation, the server database engine:
    gets transactions by either requesting pending transactions from a server or waiting for the server to send the transactions.

14. The system of claim 10, wherein, in operation, the server database engine:
    selects one or more grantees from a contact list;
    enables attribute permissions for selected contacts;
    calls a server method to update permission settings on a server.

15. The system of claim 10, wherein, in operation, the server database engine:
    updates a permissions table as specified by a grantor;
    for each new device owned by the grantor, sends new permission settings;
    for each device owned by a grantee, sends new attribute values;

if the grantor is granting permission, sends the attribute value sent in an update permissions call;

if the grantor is taking away permissions, sends a null value.

16. The system of claim 10, wherein, in operation, the server database engine:

selects from a permissions table grantees for attributes of a grantor;

joins grantees with the attribute changes;

creates attribute transactions;

sends attribute transactions changes to destinations associated with the grantees.

17. The system of claim 10, wherein, in operation, the server database engine:

selects from a device table devices of a grantor;

joins grantees with the attribute changes;

creates personal attribute record (PAR) transactions;

sends PAR changes to destinations associated with the grantor.

18. The system of claim 10, wherein the first entity comprises a mobile device, and the second entity comprises a mobile device.

\* \* \* \* \*